US009994484B2

(12) United States Patent  
Perez-Pena

(10) Patent No.: US 9,994,484 B2
(45) Date of Patent: Jun. 12, 2018

(54) FAST SETTING PORTLAND CEMENT COMPOSITIONS WITH ALKALI METAL CITRATES AND PHOSPHATES WITH HIGH EARLY-AGE COMPRESSIVE STRENGTH AND REDUCED SHRINKAGE

(71) Applicant: United States Gypsum Company, Chicago, IL (US)

(72) Inventor: Marianela Perez-Pena, Grayslake, IL (US)

(73) Assignee: UNITED STATES GYPSYM COMPANY, Chicago, IL (US)

(*) Notice: Subject to any disclaimer, the term of this patent is extended or adjusted under 35 U.S.C. 154(b) by 521 days.

(21) Appl. No.: 13/954,581

(22) Filed: Jul. 30, 2013

(65) Prior Publication Data

US 2015/0033989 A1    Feb. 5, 2015

(51) Int. Cl.
| | |
|---|---|
| *C04B 28/04* | (2006.01) |
| *C04B 24/04* | (2006.01) |
| *C04B 22/16* | (2006.01) |
| *C04B 28/14* | (2006.01) |
| *C04B 103/12* | (2006.01) |
| *C04B 111/00* | (2006.01) |
| *C04B 111/10* | (2006.01) |
| *C04B 111/34* | (2006.01) |

(52) U.S. Cl.
CPC .............. *C04B 24/04* (2013.01); *C04B 22/16* (2013.01); *C04B 28/04* (2013.01); *C04B 28/14* (2013.01); *C04B 2103/12* (2013.01); *C04B 2111/0062* (2013.01); *C04B 2111/1006* (2013.01); *C04B 2111/34* (2013.01); *Y02W 30/92* (2015.05)

(58) Field of Classification Search
CPC .. C04B 7/02; C04B 7/19; C04B 22/16; C04B 24/04; C04B 24/06; C04B 40/0082; C04B 28/14; C04B 28/04; C04B 14/12; C04B 18/08; C04B 2103/12; C04B 2111/0062; C04B 2111/1006; C04B 2111/34
See application file for complete search history.

(56) References Cited

U.S. PATENT DOCUMENTS

| | | | |
|---|---|---|---|
| 4,054,461 A | 10/1977 | Martin | |
| 4,111,711 A * | 9/1978 | Kiehl | C04B 7/00 106/692 |
| 4,190,454 A * | 2/1980 | Yamagisi et al. | 106/695 |
| 4,488,909 A | 12/1984 | Galer et al. | |
| 4,494,990 A | 1/1985 | Harris | |
| 4,888,058 A | 12/1989 | Rosenberg et al. | |
| 5,490,889 A | 2/1996 | Kirkpatrick et al. | |
| 5,494,516 A | 2/1996 | Drs et al. | |
| 5,536,310 A | 7/1996 | Brook et al. | |
| 5,536,458 A | 7/1996 | Kawakita et al. | |
| 5,629,048 A * | 5/1997 | Kinney | C04B 24/06 106/696 |
| 5,634,972 A * | 6/1997 | Pacanovsky | C04B 24/06 106/696 |
| 5,641,349 A | 6/1997 | Koubek et al. | |
| 5,716,448 A | 2/1998 | Furusawa et al. | |
| 5,772,753 A | 6/1998 | Valenti | |
| 5,792,252 A * | 8/1998 | Sprouts | C04B 28/04 106/724 |
| 5,997,632 A | 12/1999 | Styron | |
| 6,113,684 A | 9/2000 | Krnbargi | |
| 6,133,347 A | 10/2000 | Vickers, Jr. et al. | |
| 6,238,476 B1 | 5/2001 | Srinkle | |
| 6,342,284 B1 * | 1/2002 | Yu | C04B 22/16 106/772 |
| 6,398,864 B1 | 6/2002 | Przybysz et al. | |
| 6,406,537 B1 | 6/2002 | Immordino | |
| 6,409,824 B1 | 6/2002 | Veeramusneni et al. | |
| 6,451,880 B1 * | 9/2002 | Jardine | 524/5 |
| 6,475,275 B1 | 11/2002 | Nebesnak et al. | |
| 6,727,315 B2 | 4/2004 | Yamamoto et al. | |
| 6,749,660 B2 | 6/2004 | Hince | |
| 6,827,776 B1 | 12/2004 | Boggs et al. | |
| 6,869,474 B2 | 3/2005 | Perez-Pena et al. | |

(Continued)

FOREIGN PATENT DOCUMENTS

| | | |
|---|---|---|
| CA | 1272742 A | 8/1990 |
| DE | 613105 C | 5/1935 |

(Continued)

OTHER PUBLICATIONS

International Search Report and the Written Opinion of the International Searching Authority dated Oct. 31, 2014 in PCT Application No. PCT/US2014/047582 filed Jul. 22, 2014.
Japanese Office Action dated Mar. 20, 2018 for Japanese Patent Application No. 2016-531750 to United States Gypsum Company filed Jan. 28, 2016.

*Primary Examiner* — Anthony J Green

(74) *Attorney, Agent, or Firm* — Vorys, Sater, Seymour and Pease LLP; Pradip Sahu; Philip T. Petti

(57) ABSTRACT

A method of making a rapid setting composition for cement boards is disclosed. Compositions including a hydraulic cement preferably portland cement, an alkali metal citrate such as tripotassium citrate, and a phosphate such as sodium trimetaphosphate, with optional gypsum, and no alkanolamine accelerant, and no fly ash based cement. An interaction between the alkali metal citrate and the phosphate increases the effectiveness of accelerating reactions of the portland cement without need for an alkanolamine accelerant, even in the presence of gypsum. This allows unexpected quick setting and increased early-age compressive strength without shrinkage in the cement board compositions.

20 Claims, 11 Drawing Sheets

(56) References Cited

U.S. PATENT DOCUMENTS

| | | |
|---|---|---|
| 7,036,586 B2 | 5/2006 | Roddy et al. |
| 7,270,853 B2 | 9/2007 | Rodrigues et al. |
| 7,373,982 B2 | 5/2008 | Brothers et al. |
| 7,504,165 B2 | 3/2009 | Lettkeman et al. |
| 7,670,427 B2 | 3/2010 | Perez-Pena et al. |
| 7,776,985 B2 | 8/2010 | Rodrigues et al. |
| 7,829,627 B2 | 11/2010 | Rodrigues et al. |
| 8,070,878 B2 | 12/2011 | Dubey |
| 8,106,118 B2 | 1/2012 | Rodrigues et al. |
| 8,257,487 B2 | 9/2012 | Ludwig et al. |
| 8,298,332 B2 | 10/2012 | Dubey |
| 8,298,328 B2 | 11/2012 | Yang et al. |
| 2002/0099115 A1 | 7/2002 | Shibai et al. |
| 2005/0127550 A1 | 6/2005 | De Bruyn et al. |
| 2006/0169183 A1* | 8/2006 | Waser .................. C04B 28/04 106/802 |
| 2008/0190062 A1* | 8/2008 | Engbrecht ............ B32B 13/14 52/408 |
| 2008/0302276 A1 | 12/2008 | Perez-Pena et al. |
| 2009/0011207 A1* | 1/2009 | Dubey ................ C04B 20/1051 428/219 |
| 2010/0071597 A1 | 3/2010 | Perez-Pena |
| 2010/0072294 A1* | 3/2010 | Nakashima ............ C04B 28/02 239/1 |
| 2010/0172469 A1 | 7/2010 | Poulsen et al. |
| 2010/0240556 A1 | 9/2010 | Keys et al. |
| 2011/0151265 A1 | 6/2011 | Killilea et al. |
| 2011/0196070 A1 | 8/2011 | Keller et al. |
| 2011/0306705 A1 | 12/2011 | Dombrowski et al. |
| 2012/0024196 A1 | 2/2012 | Gong et al. |
| 2012/0040165 A1 | 2/2012 | Dubey |
| 2012/0077907 A1 | 3/2012 | Lazurus et al. |
| 2012/0148806 A1 | 6/2012 | Dubey et al. |
| 2012/0172469 A1 | 7/2012 | Perez-pena |
| 2012/0196046 A1 | 8/2012 | Nicoleau et al. |
| 2012/0220696 A1 | 8/2012 | Nicoleau et al. |
| 2012/0270969 A1 | 10/2012 | Bichler et al. |
| 2012/0325478 A1 | 12/2012 | Muthusamy et al. |

FOREIGN PATENT DOCUMENTS

| | | |
|---|---|---|
| EP | 0899246 A1 | 3/1999 |
| EP | 2001817 | 12/2008 |
| JP | S63147849 A | 6/1988 |
| JP | 2012520821 A | 9/2012 |
| JP | 2013518795 A | 5/2013 |
| WO | 2007/111850 A2 | 10/2007 |
| WO | 2011096925 A | 8/2011 |

* cited by examiner

FAST SETTING PORTLAND CEMENT COMPOSITIONS WITH ALKALI METAL CITRATES AND PHOSPHATES WITH HIGH EARLY-AGE COMPRESSIVE STRENGTH AND REDUCED SHRINKAGE

FIELD OF THE INVENTION

This invention relates generally to very fast setting, fly ash free cementitious compositions comprising portland cements that can be used for a variety of applications in which rapid hardening and attainment of early strength and low shrinkage is desirable. In particular, the invention relates to cementitious compositions that can be used to make boards and other concrete installations with excellent moisture durability for use in wet and dry locations in buildings. Precast concrete products such as cement boards and other concrete applications are made with portland cements and optional other hydraulic cements other than fly ash based cements under conditions which provide a rapid setting of the cementitious mixture so the boards or other concrete installations can be handled soon after the cementitious mixture is poured into a stationary or moving form or over a continuously moving belt or other concrete installation. Ideally, this setting of the cement mixture may be achieved as soon as about 10 minutes, preferably as soon as about 5 minutes, after mixing the cement mixture with a suitable amount of water.

BACKGROUND OF THE INVENTION

U.S. Pat. No. 7,670,427 to Perez-Pena et al., incorporated herein by reference, discusses very fast setting of cementitious compositions for producing cement-based products such as cement boards achieved by adding an alkanolamine and a polyphosphate to a hydraulic cement such as portland cement and forming a slurry with water under conditions that provide an initial slurry temperature of at least 90° F. (32° C.). Additional reactive materials may be included such as high alumina cement, calcium sulfate and a pozzolan material such as class C fly ash.

U.S. Pat. No. 6,869,474 to Perez-Pena et al., incorporated herein by reference, discusses extremely fast setting of cementitious compositions for producing cement-based products such as cement boards achieved by adding an alkanolamine to hydraulic cement such as portland cement, and forming a slurry with water under conditions that provide an initial slurry temperature of at least 90° F. (32° C.). Additional reactive materials may be included such as high alumina cement, calcium sulfate and a pozzolanic material such as fly ash. Triethanolamine additions have been found to be a very powerful accelerator capable of producing formulations with relatively short final setting times with increased levels of fly ash and gypsum and without the need of calcium aluminate cements.

U.S. Pat. No. 8,070,878 to Dubey, incorporated herein by reference, discusses lightweight cementitious compositions for building products which have reactive materials comprising a blend of 40-80% portland cement, 0-20% high alumina cement, 0-7% calcium sulfate (gypsum) and 0-55% fly ash. The compositions can contain both fly ash and a triethanolamine, but the compositions do not use an alkali metal citrate or polyphosphate such as sodium trimetaphosphate (STMP).

U.S. Pat. No. 6,641,658 to Dubey, incorporated herein by reference, discusses rapid setting cementitious composition useful for making cement boards containing as reactive powders portland cement, pozzolan, high alumina cement, and insoluble calcium sulfate anhydrite, which provide reduced setting times compared to the prior-art cementitious compositions. The composition preferably comprises as a reactive powder blend 35 to 90 wt. % portland cement, 0 to 55 wt. % pozzolan, 5 to 15 wt. % high alumina cement, and 1 to 8 wt. % insoluble calcium sulfate anhydrite. Substitution of insoluble calcium sulfate anhydrite for conventional soluble gypsum (a dihydrate) increases the release of heat and decreases setting times, despite the use of very high amounts of pozzolanic materials, preferably fly ash.

US Patent Application Publication 20100040165 of Dubey, incorporated herein by reference, discusses the use of a fiberglass mesh scrim lattice reinforced cementitious board system which uses a lattice of fiber as a backbone structure for a portland cement mixture which contains alkanolamine, polyphosphate like STMP, and may include fly ash with water. In all instances, the slurry mixture contains fly ash and/or an alkanolamine.

Ettringite is a calcium aluminum sulfate compound having the formula $Ca_6Al_2(SO_4)_3 \cdot 32H_2O$ or alternatively $3CaO \cdot Al_2O_3 \cdot 3CaSO_4 \cdot 32H_2O$. This is also written as $Ca_6Al_2(SO_4)_3(OH)_{12} \cdot 26H_2O$.

Ettringite forms as long needle-like crystals and provides rapid early strength to cement boards, for handling soon after being poured into a mold or over a continuous casting and forming belt.

There is a need for portland cement compositions which have final setting times typically less than about 4 to 7 minutes or less, which develop both high early stage and high long term compressive strength, but do not have migration of unwanted reactant such as alkanolamine to the surface of the panel. The final setting time is defined more generally, when the cementitious mixtures have set to the extent the cement-based products made thereof can be handled and stacked, although chemical reactions can continue for extended periods.

SUMMARY OF THE INVENTION

One embodiment of the present invention provides a method of making a fast setting slurry with early developing compressive strength comprising mixing water, a cementitious reactive powder free of fly ash, comprising hydraulic cement, and accelerating amounts of an alkali metal citrate and a phosphate.

Another embodiment of the present invention provides cementitious compositions with enhanced rapid final setting performance and enhanced early compressive strength after three hours and fourteen days. The cementitious compositions comprise a hydraulic cement such as portland cement with no fly ash, an alkali metal citrate, and a phosphate, but is free of alkanolamines and the problems of staining and bleed through to the concrete surface which result from the use of alkanolamines as accelerators in cementitious compositions.

Another embodiment of the invention provides a cementitious composition which can be mixed with water and an aggregate, the composition comprises portland cement and other optional hydraulic cement, an alkali metal citrate, and a phosphate, but is free of fly ash such as class C fly ash, and contains little or no gypsum. It provides a slurry mixture when mixed with water and the aggregate to form a cement board which does not have problems of staining, especially when high aluminum ferrite content i.e. portland cement with 5 to 15 weight % ferrite in the portland cement is used. Gypsum can be used to prevent formation of iron-rich gels when, this high aluminum ferrite content portland cement is used, to reduce staining in the final concrete product. However, gypsum has been shown to reduce the rate of reaction in the portland cement compositions of the invention. Thus, the amount of gypsum used should be minimized to balance the effect on reactivity while preventing the formation of iron-rich gels.

Fly ash is not needed in the present compositions and typically there is an absence of fly ash. Fly ash may have an adverse effect on foaming and may require a significantly increased amount of air entraining agent to foam in view of inconsistent levels of carbon and metal content in fly ash from varying sources. It has been found the use of a phosphate with portland cement and acid salts, without fly ash or alkanolamines, in accordance with this invention, not only accelerates reactivity and final setting times, but also reduces chemical shrinkage.

It has also been found it is more difficult to control the color of concrete when fly ash is used compared to cementitious mixtures with portland cement. The use of portland cement without fly ash avoids color variability in addition to reducing chemical shrinkage compared to cement boards made with cementitious compositions containing portland cement, fly ash, alkali metal citrates and triethanolamine. U.S. Pat. No. 8,357,239 of Boxley et al. points out the problems with the use of fly ash in concrete and suggests a pre-treatment by geopolymerization of fly ash to avoid problems in using fly ash with portland cement.

It has also been unexpectedly found the rate of reaction, the final setting time and the final compressive strength of cement compositions of embodiments of the present invention made with portland cement with increased amounts of aluminum ferrite such as Lehigh Cement, Holcim cement, and St Mary's cement, are increased in the absence of an alkanolamine, such as triethanolamine. The reactivity of these portland cements is unexpectedly found to be directly opposite of the reactivity of these same aluminum ferrite cements when a triethanolamine accelerator is added to the cements.

Thus, this invention relates generally to fast setting cementitious compositions, and methods of making such compositions, that can be used for a variety of applications in which rapid final setting and attainment of early strength is desirable. Using the alkali metal citrate in combination with the phosphate to accelerate setting of the cementitious composition, particularly when the slurry is formed at elevated temperatures, makes possible increased rate of production of cementitious products such as cement boards while reducing use of gypsum and eliminating the need for additives such as alkanolamine reaction accelerators and fly ash.

The cementitious compositions of the present invention can be used to make precast concrete products such as cement boards with excellent moisture durability for use in wet and dry locations in buildings. The precast concrete products such as cement boards are made under conditions which provide a rapid final setting of the cementitious mixture, i.e., when no indentation is identified under the standard Gilmore needle test method discussed below, so the boards can be handled soon after the cementitious mixture is poured into a stationary or moving form or over a continuously moving belt.

During the process of making precast concrete products tiny air bubbles are added by making pre-formed foam by using air-entraining admixtures and subsequently creating a lightweight concrete product with bulk density in the range of 30 to 115 pcf. The use of high dosages of fly ash reduces the amount of air entrainment and causes the foam bubbles to coalesce, which in turn leads to microstructure defects and relatively lower strength. Use of portland cements provides relatively stable bubbles and leads to higher compressive strengths when foamed concrete products are designed.

Rapid set is achieved by preparing the slurry containing a
  mixture of water,
  a cementitious reactive powder comprising hydraulic
    cement, and
  set accelerating amounts of phosphate, at above ambient
    temperatures, for example at least about 90° F. (32.2°
    C.), more preferably at least about 100° F. (38° C.) or
    at least about 105° F. (41° C.) or at least about 110° F.
    (43° C.). Typically the slurry has an initial temperature
    of about 90° F. to 160° F. (32° C. to 71° C.) or more
    preferably about 90° F. to 135° (32.2° C. to 57° C.),
    most preferably about 120 to 130° F. (49 to 54° C.).

The final setting time (i.e., the time after which cement boards can be handled) of the cementitious composition as measured according to the Gilmore needle test should be at most 20 minutes, more preferably at most 10 minutes, or at most 5 minutes, after being mixed with a suitable amount of water. A shorter setting time and higher early compressive strength help to increase the production output and lower the product manufacturing cost.

The amount of alkali metal citrate in the slurry is preferably in the range of about 1.0 to 4.5 wt %, more preferably about 3.0 to 4.5 wt %, based on the cementitious reactive components (cementitious reactive powder) of the invention. Potassium citrate in the form of tripotassium citrate is the preferred alkali metal citrate.

The amount of the phosphate is about 0.15 to 1.0 wt. %, preferably about 0.3 to 0.9 wt. % based on the cementitious reactive components of the invention. While the preferred phosphate is the sodium trimetaphosphate (STMP), formulations with other phosphates such as potassium tripolyphosphate (KTPP), sodium tripolyphosphate (STPP), tetrasodium pyrophosphate (TSPP), tetrapotassium pyrophosphate (TKPP), dicalcium phosphate, and monopotassium phosphate (MKP) also enhance final setting performance and enhance compressive strength. The phosphates also overcome the effect of increased induction times and relatively longer setting times which occur when the gypsum content is increased in the mixture. The current invention is not restricted to phosphate since monopotassium phosphate (MKP) may be as efficient as using sodium trimetaphosphate (STMP). The definition of polyphosphate is that these compounds share the oxygen ion like in the case of the STMP which is not the case for MKP.

As mentioned above, these weight percents are based on the weight of the cementitious reactive components (cementitious reactive powder). This will include at least at least one hydraulic cement, preferably a portland cement, and may also include at least one other hydraulic cement, such as calcium aluminate cement, and include a calcium sulfate, e.g., gypsum. The cementitious reactive components are suitable to form a slurry with water. Cementitious reactive components include pozzolans, for example fly ash. Cementitious reactive components do not include inert ingredients, for example aggregate or filler.

A typical cementitious reactive powder includes about 60 to 100 wt % portland cement, wherein weight percent is based on the sum of the portland cement, any other cement, and gypsum.

Another typical cementitious reactive powder includes about 80 to 100 wt % portland cement, 0 to 20 wt % additional hydraulic cement other than fly ash based cement, such as a calcium aluminate cement, and 0 to about 10 wt % calcium sulfate (gypsum), based on the sum of the portland cement, non-fly ash hydraulic cement, and calcium sulfate.

Lime is part of the cementitious reactive powder and is an ingredient typically used to help obtain rapid set. Presence of excess lime in cement boards is detrimental to their long-term durability. Cement boards often are reinforced with polymer coated glass fiber mesh that degrades, losing strength and ductility in a high alkaline environment such as that caused by excess lime (for example, more than 10%).

The reactive powder blend of the cementitious composition therefore should be free of externally added lime. Reduced lime content would help to lower the alkalinity of the cementitious matrix and thereby increase the long-term durability of the product.

There is a beneficial interaction between the phosphate and the alkali metal citrate. Adding the phosphate and alkali metal citrate has the benefits of achieving a short final set and increasing early compressive strength for compositions without the need for accelerants, like alkanolamines which bleed through to the surface of the panel, without the need for fly ash additives which cause chemical shrinkage and staining, and/or without the need for additives such as gypsum to counteract staining of the cement board product. The phosphate also reduces the amount of alkali metal citrate required, compared to compositions lacking the phosphate.

In addition, adding the phosphate improves mix fluidity, contrary to other accelerators such as aluminum sulfate which may lead to premature stiffening of concrete mixtures.

Other additives such as one or more of sand, aggregate, lightweight fillers, water reducing agents such as superplasticizers, set accelerating agents, set retarding agents, air-entraining agents, foaming agents, shrinkage control agents, slurry viscosity modifying agents (thickeners), coloring agents and internal curing agents, may be included as desired depending upon the process ability and application of the cementitious composition of the invention.

If desired the reactive powder blend of the invention may include or exclude non-fly ash based hydraulic cements such as calcium aluminate cement (CAC) (also commonly referred to as aluminous cement or high alumina cement) and/or calcium sulfate. In another embodiment the reactive powder blend excludes high alumina cement and includes as reactive powder components only portland cement, at least one alkali metal citrate, at least one phosphate, and additives All percentages, ratios and proportions herein are by weight, unless otherwise specified.

DETAILED DESCRIPTION OF THE INVENTION

Figure 1:
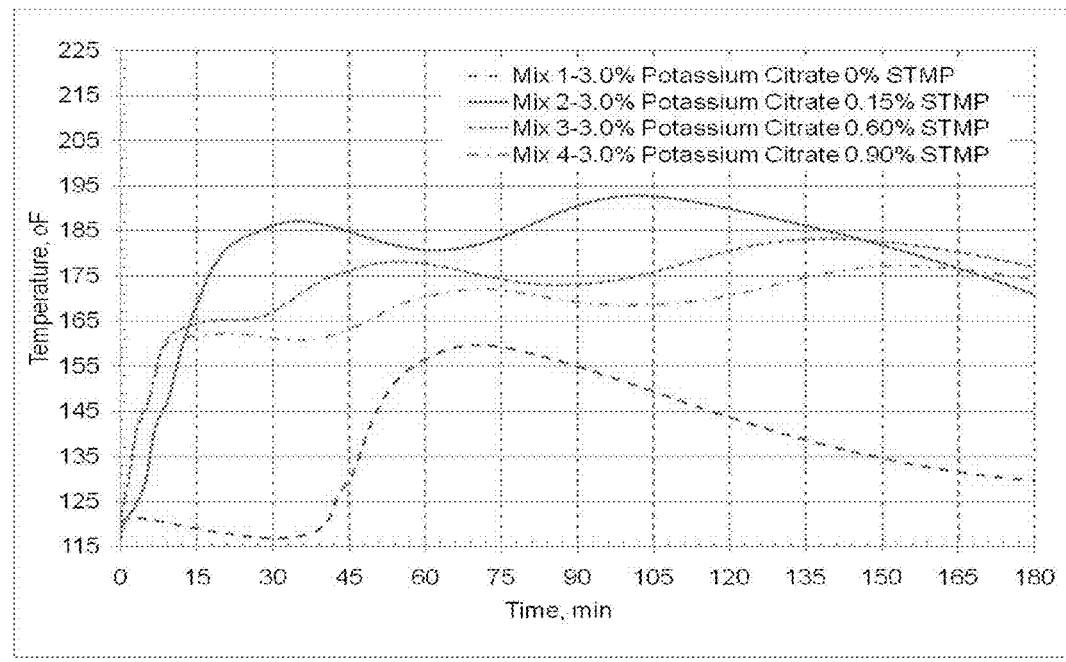
FIG. 1 is a graph of the results of TABLE 3 showing the effect of Holcim Type III portland cement with 3% potassium citrate and varying amounts of STMP.
Figure 2:
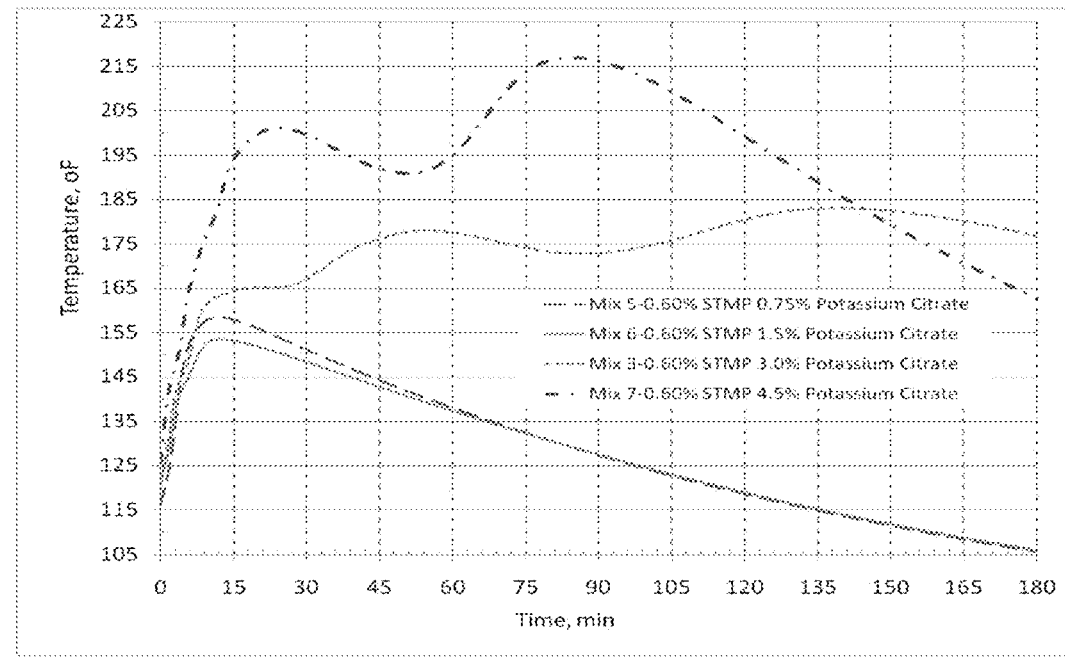
FIG. 2 is a graph of the results of TABLE 4 showing time rate set (TRS) data for Holcim portland cement with 0.60% STMP and varying amounts of potassium citrate.

The present invention mixes cementitious reactive powder with an alkali metal citrate a phosphate and water at an initial slurry temperature of at least 90 F(32.2 C.) to yield a rapid set of less than 30 minutes, more preferably less than 20 minutes, and most preferably less than 10 minutes or less than 5 minutes.

The present invention also provides cementitious compositions with enhanced rapid final setting performance and enhanced early compressive strength.

While not wishing to be limited to a particular theory, it is theorized rapid sets are achieved by providing the cementitious reactive powder, e.g., 80-100 wt % portland cement having a relatively high ferrite content, if color of the cement is not an issue, 0-20 wt % hydraulic cement other than fly ash based cement, e.g., calcium aluminate cement, and 0 to 10% calcium sulfate (gypsum) on a dry basis, and mixing the cementitious reactive powder, alkali metal citrate, phosphate, and water so formation of ettringite and/or other hydrates of calcium aluminate and/or calcium phosphate compounds can take place as a result of the hydration of this reactive powder blend.

Thus, a suitable amount of water is provided to hydrate the cementitious reactive powder and to rapidly form ettringite, other hydrates of calcium aluminate compounds and/or calcium phosphate. Generally, the amount of water added will be greater than theoretically required for the hydration of the cementitious reactive powder. This increased water content facilitates the workability of the cementitious slurry.

Typically, in the slurry the weight ratio of the water to cementitious reactive powder blend is about 0.20/1 to 0.80/1, preferably about 0.30/1 to 0.60/1 and more preferably about 0.375/1. The amount of water depends on the needs of the individual materials present in the cementitious composition.

Typically, the use of portland cements with relatively high C4AF (tetracalcium aluminum iron oxide or the ferrite phase) produce concrete with increased sulfate resistance. The conversion from ettringite to monosulfate in this type portland cement is inhibited by the presence of the iron component. However, the reaction is slow and decreased further in the presence of gypsum. The use of potassium citrate in combination with sodium trimetaphosphate (STMP) enhances the early strength and shortens the setting times of cements containing high C4AF in the absence of alkanolamines. Increased C4AF cements have dark color which is traditionally preferred in the industry.

Ettringite, other hydrates of calcium aluminate and/or calcium phosphate compounds form very rapidly in the hydration process thus imparting rapid set and rigidity to the mixtures made with the cementitious reactive powder blend of the cementitious composition of the invention. In manufacturing of cement-based products such as cement boards, it is primarily the formation of ettringite, other calcium aluminate hydrates and/or calcium phosphate compounds that makes possible handling of cement boards within a few minutes after the cementitious composition of the invention is mixed with a suitable amount of water.

Setting of the composition is characterized by initial and final set times, as measured using Gilmore needles specified in the ASTM C266 test procedure. The final set time also corresponds to the time when a cement-based product, e.g. a cement board, has sufficiently hardened so it can be handled. Those skilled in the art will understand curing reactions continue for extended periods after reaching the final setting time.

Early age strength of the composition is characterized by measuring the compressive strength after 3 hours and then 14 days of curing as specified in the ASTM C109. Specifically, cube specimens are cast simultaneously and kept inside a sealed plastic bag containing moist towel at a temperature of 154° F. (68° C.) until time of the test. The compressive strength of at least three cubes from each tested mix was measured. The maximum load required to crush the cubes was measured using SATEC UTC 120HVL compression machine, which was programmed to meet the rate of loading specified by procedure ASTM C109. Achieving high early strength allows for ease of handling the stacked panels.

The present invention includes the following compositions of TABLE A.

TABLE A

| Ingredient | Cementitious Reactive Powder Composition | | |
|---|---|---|---|
| | Broad, wt % of total composition on a water free basis | Intermediate, wt % of total composition on a water free basis | Narrow, wt % of total composition on a water free basis |
| Cementitious Reactive Composition (Cementitious reactive powder) | 40-98 | 60-95 | 65-85 |
| Phosphates | 0.05 to 1.5 wt. %* or 0.15 to 1.0 wt. %* | 0.3 to 0.9 wt. %* or 0.3 to 0.6 wt. %* | 0.15 to 0.3 wt. %* |
| Alkali metal citrate | 1.0 to 4.5 wt %* | 2.0 to 4.5 wt %* | 3.0 to 4.5 wt %* |
| Secondary inorganic set accelerators | less than 2 wt %* | less than 1 wt %* | about 0.1 to 1 wt %* |
| Mineral additives | 0-20 | 0-15 | 0-10 |
| Water reducing agents (superplasticizers) | 0.1 to 0.5 wt. %* | | 0.1-0.2 wt. %* |
| Air entraining agents | 0.01 to 1.5 wt. %* | 0.01 to 1.2 wt. %* | 0.01 to 1 wt. %* |
| Other Chemical Additives and Ingredients, for example shrinkage control agents, coloring agents, viscosity modifying agents (thickeners) and internal curing agents | 0-5 wt. % | 0-4 wt. % | 0-2 wt. % |
| Ratio of Aggregates and Fillers to the Cementitious Reactive Composition | 0.4-1.2:1 | 0.4-0.7:1 | 0.5-0.6:1 |

*based on the cementitious reactive components

Cementitious Reactive Powder

Cementitious reactive powder (also known as cementitious reactive components) includes cements, pozzolans, and added lime. It does not include inert aggregates and fillers. The principal ingredient of the cementitious reactive powder of the invention is hydraulic cement, preferably portland cement.

Other ingredients of the cementitious reactive powder may include high alumina cement and calcium sulfate. Preferably, calcium aluminate cement and calcium sulfate are used in small amounts such as 0 to 10 wt. %, for example 2 to 10 wt % of the cementitious reactive powder, and preferably excluded, leaving only the portland cements, alkali metal citrate and phosphate as accelerators. Other hydraulic cements such as calcium aluminates, ground granulated blast furnace slag, or calcium sulfoaluminate can be added but are not needed.

When other hydraulic cements are present, the cementitious reactive powder may typically comprise 80-100 wt % portland cement, 0 to 20 wt % calcium aluminate cement, and 0 to 7 wt % calcium sulfate, based on the sum of the weights of these components.

TABLE B

Cementitious Reactive Powder Composition

| Ingredient | Broad, wt % of total Cementitious Reactive Powder | Intermediate, wt % of total Cementitious Reactive Powder | Narrow, wt % of total Cementitious Reactive Powder |
| --- | --- | --- | --- |
| Hydraulic Cement | 60-100* | 80-100* | 95-100* |
| Portland cement | 60-100 | 80-100 | 95-100 |
| Calcium aluminate cement | 0-20 | 0-10 | 0-5 |
| Calcium sulfate | 0-7 | 0-6 | 0-5 |
| Other hydraulic cements | 0-5 | 0-3 | 0-1 |
| Pozzolans | 0-40 | 0-20 | 0-5 |
| Added Lime | 0-7 | 0-6 | 0-5 |

*Wt. % based on sum of portland cement, any other cement, and gypsum

Hydraulic Cement

Hydraulic cements, particularly portland cement, make up a substantial amount of the compositions of embodiments of the invention. It is to be understood that, as used here, "hydraulic cement" does not include gypsum, which does not gain strength under water, although typically some gypsum is included in portland cement. ASTM C 150 standard specification for portland cement defines portland cement as hydraulic cement produced by pulverizing clinker consisting essentially of hydraulic calcium silicates, usually containing one or more of the forms of calcium sulfate as an inter-ground addition. More generally, other hydraulic cements may be substituted for portland cement, for example calcium sulfo-aluminate based cements. To manufacture portland cement, an intimate mixture of limestone and clay is ignited in a kiln to form portland cement clinker.

Tricalcium Aluminate and Ferrite Phases

The following four main phases of Portland cement are present in the clinker-tricalcium silicate ($3CaO.SiO_2$, also referred to as $C_3S$), dicalcium silicate ($2CaO.SiO_2$, called $C_2S$), tricalcium aluminate ($(CaO)_3.(Al_2O_3)$ or $C_3A$), and tetracalcium aluminoferrite ($4CaO.Al_2O_3.Fe_2O_3$ or $C_4AF$). The resulting clinker containing the above compounds is inter-ground with calcium sulfates to desired fineness to produce the portland cement. Please notice cement notation indicates $C=CaO$, $A=Al_2O_3$, $F=Fe_2O_3$, $S=SO_3$, $H=H_2O$.

Although the aluminate and ferrite phases comprise less than 20% of the bulk of cement, their reactions are very important in developing fast setting formulations. Relative to $C_3S$, the hydration of $C_3A$ is very fast. The left side of equation 3 below shows the reaction of $C_3A$ from the portland cement as it hydrates with water to form two intermediate hexagonal phases, $C_2AH_8$ and $C_4AH_{13}$, which transform spontaneously into the fully hydrated, thermodynamically stable cubic phase, $C_3AH_6$ as indicated in Equation 4.

$$2(CaO)_3(Al_2O_3)+21H_2O \rightarrow (CaO)_4(Al_2O_3).13(H_2O)+ (CaO)_2(Al_2O_3).8(H_2O) \quad (3)$$

$$(CaO)_4(Al_2O_3).13(H_2O)+(CaO)_2(Al_2O_3).8(H_2O) \rightarrow 2(CaO)_3(Al_2O_3).6(H_2O)+9H_2O \quad (4)$$

If the very rapid and exothermic hydration of $C_3A$ is allowed to proceed unhindered in cement, then the setting occurs too quickly and the cement does not develop strength. Therefore, gypsum [calcium sulfate dihydrate, $CaSO_4.2(H_2O)$] is added to slow down the $C_3A$ hydration. In the presence of gypsum, tricalcium aluminate forms ettringite, $[Ca_3Al_2(OH)_6.12(H_2O)]_2.(SO_4)_3.2(H_2O)$, Equation 5, which can also be written as $(CaO)_3(Al_2O_3).3(CaSO_4).32(H_2O)$.

$$(CaO)_3(Al_2O_3)+3CaSO_4-2(H_2O)+26H_2O \rightarrow (CaO)_3(Al_2O_3)(CaSO_4)_3.32(H_2O) \quad (5)$$

Tetracalcium aluminoferrite ($C_4AF$) from the portland cement reacts much like $C_3A$, i.e., forming ettringite in the presence of gypsum as indicated below in equation (6)

$$3(CaO)4(Al_2O_3)(Fe_2O_3)+12CaSO_4-2(H_2O)+110 \rightarrow H_2O$$

$$4[(CaO)6(Al_2O_3)(Fe_2O_3))(CaSO_4)_3.32(H_2O)]+2(Al_2O_3)(Fe_2O_3).3(H_2O) \quad (6)$$

However, hydration the ferrite phase is much slower than hydration of $C_3A$, and water is observed to bead up on the surface of $C_4AF$ particles. This may be due to the fact that iron is not as free to migrate in the pastes as aluminum, which may cause the formation of a less permeable iron rich layer at the surface of the $C_4AF$ particles and isolated regions of iron hydroxide. In cement, if there is insufficient gypsum to convert all of the $C_4AF$ to ettringite, then an iron-rich gel forms at the surface of the silicate particles which is proposed to slow down their hydration. The iron rich gels are thought to contribute to staining of the cement board product.

This invention seeks to overcome the slow reactivity of the ferrite phase by increasing its hydrolysis in the presence of the potassium citrate and further overcome the slow reactivity in the presence of gypsum by adding sodium trimetaphosphate or other phosphates such as monopotassium phosphate and other phosphate phases.

The other compounds present in minor amounts in portland cement include double salts of alkaline sulfates, calcium oxide, and magnesium oxide. When cement boards are to be made, the portland cement will typically be in the form of very fine particles such that the particle surface area is greater than 4,000 $cm^2$/gram and typically between 5,000 to 6,000 $cm^2$/gram as measured by the Blaine surface area method (ASTM C 204). Of the various recognized classes of portland cement, ASTM Type III portland cement is most preferred in the cementitious reactive powder of the cementitious compositions of the invention. This is due to its relatively faster reactivity and high early strength development.

In the present invention, a number of Type III portland cements with ferrite contents of 5 to 15 wt % can be used as illustrated in the list on TABLE 1 and 2 for the chemical oxide analysis and chemical ingredients of three different cements used in the examples of the present invention. Other recognized types of cements which may be used to replace or supplement Type III portland cement in the composition of the invention include Type I portland cement, or other hydraulic cements including Type II portland cement, white cement, slag cements such as blast-furnace slag cement, pozzolan blended cements, expansive cements, sulfo-aluminate cements, and oil-well cements.

Pozzolanic Mineral Additives

The hydraulic cement may be partially substituted by mineral additive fillers possessing substantial, little, or no cementing properties. For purposes of the present description mineral additives are typically one or more of pozzolans, 'Mineral Additive' is called as the usage of crushed materials like cement, which are stored in silos powder form, blast furnace slag, fly ash, silica fume, tras, stone dust, with the aim of improve some properties of concrete or in order to bring special qualifications to concrete. Mineral additives does not have any binding properties like cement when they are used alone, but when it is used together, they do similar task with cement, hence they contribute to the economy of cement. Mineral additives are used also in the production of high-strength concrete. This additional contributions not only strengthen concrete additionally, but also increases the performance in terms of durability of concrete. They are used all over the world and our country. They are used against all kinds of physical, chemical and electrochemical external factors in producing long-lasting structures that reinforced with concrete and portland cement or portland cement clinker which are used in combination.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Various natural and man-made materials have been referred to as pozzolanic materials possessing pozzolanic properties. Some examples of pozzolanic materials which can be used in embodiments of the present invention include pumice, diatomaceous earth, silica fume, volcanic tuff, rice husk, metakaolin, ground granulated blast furnace slag, vermiculite clays, calcium carbonate, and crushed mica. All of these pozzolanic materials can be used either singly or in combined form as part of the cementitious reactive powder of the invention, although the use of pozzolan materials is not preferred and is not necessary for the improved setting times and early age compressive strength achieved in the present invention. Moreover, use of fly ash based mineral additives like Class C fly ash should normally be limited to no more than about 10% by weight of the reactive powder and preferably avoided all together if chemical shrinkage, foaming and/or discoloration of the concrete are issues in the final product.

Inert Aggregates and Fillers

As opposed to pozzolanic mineral additives, the aggregates and fillers are inert. For example, mineral additives such as fly ash, silica fume, etc. will react with the portland cement, aggregates and fillers do not react with the portland cement. While the disclosed cementitious reactive powder blend defines the rapid setting component of the cementitious composition of the invention, it will be understood by those skilled in the art that other materials may be included in the composition depending on its intended use and application.

For instance, for cement board applications, it is desirable to produce lightweight boards without unduly compromising the desired mechanical properties of the product. This objective is achieved by adding lightweight aggregates and fillers. Examples of useful lightweight aggregates and fillers include sand, expanded forms of clay, volcanic tuff, shale, and perlite, hollow ceramic spheres, hollow plastic spheres, expanded plastic beads, and the like. For producing cement boards, expanded clay and shale aggregates are particularly useful. Expanded plastic beads and hollow plastic spheres when used in the composition are required in very small quantity on weight basis owing to their extremely low bulk density.

Depending on the choice of lightweight aggregate or filler selected, the weight ratio of the lightweight aggregate or filler to the reactive powder blend may be about 1/100 to 200/100, preferably about 2/100 to 125/100. For example, for making lightweight cement boards, the weight ratio of the lightweight aggregate or filler to the reactive powder blend preferably will be about 2/100 to 125/100. In applications where the lightweight product feature is not a critical criterion, river sand and coarse aggregate as normally used in concrete construction may be utilized as part of the composition of the invention.

Calcium Sulfate

Various forms of calcium sulfate as shown below may be used in the invention to provide sulfate ions for forming ettringite and other calcium sulfo-aluminate hydrate compounds:

Dihydrate-$CaSO_4.2H_2O$ (commonly known as gypsum or landplaster)

Hemihydrate-$CaSO_4.1/2H_2O$ (commonly known as stucco or plaster of Paris or simply plaster)

Anhydrite-$CaSO_4$ (also referred to as anhydrous calcium sulfate)

Landplaster is a relatively low purity gypsum and is preferred due to economic considerations, although higher purity grades of gypsum could be used. Landplaster is made from quarried gypsum and ground to relatively small particles such that the specific surface area is greater than 2,000 $cm^2/gram$ and typically about 4,000 to 6,000 $cm^2/gram$ as measured by the Blaine surface area method (ASTM C 204). The fine particles are readily dissolved and supply the gypsum needed to form ettringite. Synthetic gypsum obtained as a by-product from various manufacturing industries can also be used in the present invention. The other two forms of calcium sulfate, namely, hemihydrate and anhydrite may also be used in the present invention instead of gypsum, i.e., the dihydrate form of calcium sulfate.

The use of calcium sulfate in the present invention is not preferred since calcium sulfate, like gypsum, tends to reduce the set time and final curing of the cement unless phosphates are added in the disclosed ranges to overcome this reduction in set time. It is therefore preferred that no more than 4 parts by weight gypsum is used per 100 parts by weight of total cement, more preferably 0 parts to no more than 2 parts by weight of gypsum is used per 100 parts by weight of total cement on a dry basis.

Phosphates, Alkali Metal Citrates and Secondary Inorganic Set Accelerators

While the phosphate in some preferred embodiments of the invention is sodium trimetaphosphate (STMP), formulations with other phosphates such as potassium tripolyphosphate (KTPP), sodium tripolyphosphate (STPP), tetrasodium pyrophosphate (TSPP), tetrapotassium pyrophosphate (TKPP) monopotassium phosphate (MKP), and dicalcium phosphate also provide formulations with enhanced final setting performance and enhanced early stage and final compressive strength. In contrast, it has been unexpectedly found some phosphates such as monocalcium phosphate and tricalcium phosphate, actually delay final setting.

The dosage of phosphate is about 0.05 to 1.5 wt. %, preferably about 0.3 to 0.60 wt. % and more preferably about 0.15 to −0.3 wt. % based on the cementitious reactive components of the invention. Thus for example, for 100 pounds of cementitious reactive powder, there may be about 0.05 to 1.5 pounds of phosphate.

The degree of rapid set obtained with the addition of an appropriate dosage of phosphate under conditions that yield slurry temperature greater than 90° F. (32° C.) allows a significant reduction of triethanolamine in the absence of high alumina cement.

The amount of alkali metal citrate in the slurry is preferably in the range of about 1.0 to 4.5 wt %, more preferably about 3.0 to 4.5 wt %, based on the cementitious reactive components (cementitious reactive powder) of the invention. Potassium citrate in the form of tripotassium citrate is the preferred alkali metal citrate.

As discussed above, alkali metal citrates in combination with phosphates are primarily responsible for imparting extremely rapid setting characteristics to the cementitious mixtures. However, in combination with the alkali metal citrates and phosphates, other inorganic set accelerators may optionally be added as secondary inorganic set accelerators in the cementitious composition of the invention.

Examples of secondary inorganic set accelerators include a sodium carbonate, potassium carbonate, calcium nitrate, calcium nitrite, sodium formate, sodium acetate, lithium carbonate, lithium nitrate, lithium nitrite. The use of calcium chloride should be avoided when corrosion of cement board fasteners is of concern. The secondary inorganic set accelerator are typically less than 2 wt %, preferably about 0.1 to 1 wt % of the cementitious reactive powder.

Other Chemical Additives and Ingredients

Chemical additives such as water reducing agents (superplasticizers) may be included in the compositions of the invention. They may be added in the dry form or in the form of a solution. Superplasticizers help to reduce the water demand of the mixture. Examples of superplasticizers include polynapthalene sulfonates, polyacrylates, polycarboxylates, lignosulfonates, melamine sulfonates, and the like. Depending upon the type of superplasticizer used, the superplasticizer (on dry powder basis) typically will be about 0.1 to 0.5 wt. %, more preferably about 0.2 wt. % of the cementitious reactive powder.

When it is desired to produce lightweight concrete products such as lightweight cement boards, air entraining agents are added.

Air entraining agents are added to the cementitious slurry to form air bubbles (foam) in situ. Air entraining agents are typically surfactants used to purposely trap millions of microscopic air bubbles in the concrete. Alternatively, air entraining agents are employed to externally produce foam (similar to shaving cream foam) which is introduced into the mixtures of the compositions of the invention during the mixing operation to reduce the density of the concrete product.

Examples of air entraining/foaming agents include alkyl sulfonates, alkylbenzolfulfonates and alkyl ether sulfate oligomers among others An air entraining agent (foaming agent) such as that conforming to standards as set forth in ASTM C 260/ C260M-10a "Standard Specification for Air-Entraining Admixtures for Concrete" can be employed. Such air entraining agents are well known to those skilled in the art and are described in the Kosmatka et al. "Design and Control of Concrete Mixtures," Fourteenth Edition, portland Cement Association, specifically Chapter 8 entitled, "Air Entrained Concrete," (cited in US Patent Application Publication No. 2007/0079733 A1). Commercially available air entraining materials include vinsol wood resins, sulfonated hydrocarbons, fatty and resinous acids, aliphatic substituted aryl sulfonates, such as sulfonated lignin salts and numerous other interfacially active materials which normally take the form of anionic or nonionic surface active agents, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, ABSs (alkylbenzenesulfonates), LASs (linear alkylbenzenesulfonates), alkanesulfonates, polyoxyethylene alkyl(phenyl)ethers, polyoxyethylene alkyl(phenyl)ether sulfate esters or salts thereof, polyoxyethylene alkyl(phenyl) ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof.

Typically the air entraining (foaming) agent is about 0.01 to 1 wt. % of the weight of the total composition including water.

Other chemical admixtures such as shrinkage control agents, coloring agents, viscosity modifying agents (thickeners) and internal curing agents may also be added in the compositions of the invention if desired.

METHOD OF THE INVENTION

The invention also provides a method which includes forming a slurry of water mixed with the cementitious reactive composition, phosphates, alkali metal citrate, and optional other ingredients such as secondary inorganic set accelerators, mineral additives, water reducing agents (superplasticizers), air entraining agents, other chemical additives and ingredients, for example shrinkage control agents, coloring agents, viscosity modifying agents (thickeners) and internal curing agents, aggregates and fillers. Preferably the slurry is formed by mixing these ingredients at a selected initial slurry temperature and maintaining the mixture temperature in a selected range for 5 seconds to 30 minutes. However, if desired the ingredients may be mixed at ambient temperature and rapidly heated to the desired initial temperature and then mixed at a temperature in the selected range for 5 seconds and up to 30 minutes. Then the mixture is formed into a shape and allowed to set.

Initial Slurry Temperature

In the present invention, forming the slurry under conditions which provide an initially high slurry temperature was found to be important to achieve rapid setting and hardening of cementitious formulations. The initial slurry temperature should be at least about 90° F. (32° C.). Slurry temperatures in the range of 90° F. to 160° F. (32° C. to 71° C.) or 90° F. to 135° F. (32° C. to 57° C.) produce very short setting times. The initial slurry temperature is preferably about 120° F. to 130° F. (49° to 54° C.). For purposes of the specification the term initial means when the temperature when the ingredient is combined with the water. In general, within this range increasing the initial temperature of the slurry increases the rate of temperature rise as the reactions proceed and reduces the setting time. Thus, an initial slurry temperature of 95° F. (35° C.) is preferred over an initial slurry temperature of 90° F. (32° C.), and so on. It is believed the benefits of increasing the initial slurry temperature decrease as the upper end of the above described temperature range are approached.

As will be understood by those skilled in the art, achieving an initial slurry temperature may be accomplished by more than one method. Perhaps the most convenient method is to heat one or more of the components of the slurry. In the examples, the present inventors supplied water heated to a temperature such that, when added to the dry reactive powders and unreactive (inert) solids, the resulting slurry is at the desired temperature.

Although potentially slower, a slurry could be prepared at ambient temperatures, and promptly (e.g., within about 10, 5, 2 or 1 minutes) heated to raise the temperature to about 90° F. or higher (or any of the other above-listed ranges), and still achieve benefits of the present invention.

Manufacturing of Precast Concrete Products Such as Cement Boards

Precast concrete products such as cement boards are manufactured most efficiently in a continuous process in which the reactive powder blend is blended with aggregates, fillers and other necessary ingredients, followed by addition of water and other chemical additives just prior to placing the mixture in a mold or over a continuous casting and forming belt.

Due to the rapid setting characteristics of the cementitious mixture of this invention, designed to set within 4 to 7 minutes after mixing with water, it should be appreciated that the mixing of dry components of the cementitious blend with water usually will be done just prior to the casting operation. As a consequence of the formation of hydrates of calcium aluminate compounds and the associated water consumption in substantial quantities the cement-based product becomes rigid, ready to be cut, handled and stacked for further curing.

EXAMPLES

The following examples illustrate the influence of alkali metal citrates and phosphate addition on the slurry temperature rise behavior, setting characteristics and cube compressive strength (CCS) of the cementitious compositions of the invention including, a mixture of portland cement and calcium sulfate dihydrate as the components of the reactive powder. The admixtures used were tripotassium citrate and phosphate, e.g., sodium trimetaphosphate, both added as aqueous solutions.

In addition, in some embodiments, sulfonated napthalene superplasticizer were added to control the fluidity of the mixes. These admixtures were added as weight percentage of the total cementitious reactive powder.

The compositions included in the Examples were combined using a weight ratio of water to cement (reactive powder) of 0.375/1 and a weight ratio of expanded clay aggregate to cement (cementitious reactive powder) of 0.60/1.

The temperature of the liquids was adjusted prior to mixing with cements to obtain a specific mix temperature. After mixing in a Hobart mixer the mix (about 280 grams) was placed in a 6 ounces STYROFOAM cup and placed in an insulated STYROFOAM box. The temperature response was measured continuously using a computerized data collection program. The maximum temperature rise rate, as well as the maximum temperature and time to maximum temperature were used as indications of the reactivity of the experimental mixtures.

Initial and final set times were determined with Gilmore needles according to ASTM C266. The target was to reach a final set within less than 10 minutes, preferably 5 to 7 minutes, after mixing. For the compressive strength testing cubes (2 inch. times 2 inch. times 2 inch. (5.1 cm.times.5.1 cm.times.5.1 cm) were kept inside a sealed plastic bag containing a moist towel at a temperature of 68° C. (154° F.) until the time of the test. The compressive strength of 3 cubes from each mix was determined 3 hours after the addition of the mix liquids. The maximum load required to crush the cubes was measured using a SATEC UTC 120HVL compression machine programmed to meet the rate of loading specified by procedure ASTM C109. Chemical shrinkage was measured by following a method similar to that described in ASTM C1608-12.

The raw materials and ingredients used in these particular examples were as follows:

Type III portland cement from 3 sources

Gypsum

Expanded clay aggregate

A Potassium citrate

Sulfonated naphthalene condensate superplasticizer

A phosphate selected from the group consisting of Sodium trimetaphosphate (STMP), potassium tripolyphosphate (KTPP), sodium tripolyphosphate (STPP), monopotassium phosphate and dicalcium phosphate and mixtures thereof.

In the examples below, the dry reactive powder ingredients and any aggregate used were mixed with water under conditions which provided an initial slurry temperature above ambient. Typically hot water was used having a temperature which produced slurry having an initial temperature within the range of 90°-135° F. (32-57° C.).

The examples demonstrate the synergistic roles of a potassium citrate, a phosphate and slurry temperature in a portland cement based composition. The examples report setting of the composition, characterized by initial and final set times, as measured using the above-mentioned Gilmore needles specified in the ASTM C266 test procedure, as well as high initial compressive strength as per ASTM C109.

TABLE 1

Chemical oxide analysis and cement mineral phases for Holcim, Lehigh, and St. Mary's type III portland cements.

| Wt % | Holcim | Lehigh | St. Mary's |
|---|---|---|---|
| CaO | 63.74 | 61.799 | 61.62 |
| SiO$_2$ | 19.39 | 19.41 | 19.68 |
| Al$_2$O$_3$ | 5.03 | 4.82 | 4.97 |
| Fe$_2$O$_3$ | 3.51 | 3.25 | 2.50 |
| SO$_3$ | 3.88 | 3.39 | 3.95 |
| MgO | 1.29 | 3.58 | 2.51 |
| Na$_2$O | 0.23 | 0.10 | 0.32 |
| K$_2$O | 0.34 | 0.57 | 1.13 |
| TiO$_2$ | 0.24 | 0.29 | 0.26 |
| MnO | 0.03 | 0.22 | 0.07 |
| Cr$_2$O$_3$ | 0.01 | 0.01 | 0.10 |
| P$_2$O$_5$ | 0.08 | 0.18 | 0.24 |
| SrO | 0.08 | 0.04 | 0.09 |
| LOI (1000 C) | 1.91 | 2.15 | 1.54 |
| Total | 99.76 | 99.8 | 98.89 |
| C3S | 62.3 | 57.4 | 53.1 |
| C2S | 8.6 | 12.4 | 16.4 |
| C3A | 7.4 | 7.3 | 8.9 |
| C4AF | 10.7 | 9.9 | 7.6 |
| Alkali | 0.5 | 0.5 | 1.1 |
| Blaine | 5950 | 6060 | 5930 |

TABLE 2

Definition of major chemical compounds in portland cement.

| Shorthand Notation | Name | Chemical Formula |
|---|---|---|
| C3S | Tricalcium Silicate | 3CaO•SiO$_2$ |
| C2S | Dicalcium Silicate | 2CaO•SiO$_2$ |
| C3A | Tricalcium Aluminate | 3CaO•Al$_2$O$_3$ |
| C4AF | Tetracalcium Alumino-ferrite (Ferrite Phase) | 4CaO•Al$_2$O$_3$•Fe$_2$O$_3$ |

Wherein CaO = C, SiO$_2$ = S; Al$_2$O$_3$ = A; FeO$_3$ = F; So$_3$ = S; and H$_2$O = H

EXPERIMENTAL

Three different portland cements were used in this study. Table 1 includes the chemical analysis of these cements. This study focused on developing fast setting cement compositions. Therefore, particular attention was paid to the $C_3A$ (tricalcium aluminate), and the $C_4AF$ (tetracalcium aluminum-ferrite or Ferrite phase) of these cements. From Table 1, the Holcim and the Lehigh cements have relatively higher amounts of ferrite while the St. Mary's cement contains more tricalcium aluminate and higher alkali level. All three cements have similar specific surface area as measured by the Blaine method. In addition Tripotassium citrate used in this work has the chemical formula of $K_3C_3H_5O(CO_2)_3$ and sodium trimetaphosphate $(NaPO_3)_3$, were used as the accelerating admixtures.

The compositions with each portland cement source were combined using a weight ratio of expanded clay aggregate to cement plus gypsum (reactive powder) of 0.60/1 and a fixed water to reactive powder of 0.375/1. In addition, all mixtures contained a naphthalene based superplasticizer added in a ratio of 0.10 to 0.20 wt % (of the reactive powder). Detailed formulations are included in the following sections for each set of experiments. The following parameters were measured:
1. Temperature rise and set.
2. Staining in the conditioning room with 90% relative humidy and 90° F.
3. Cube compressive strength (CCS) after 3-hrs CCS and after 14 days CCS.
4. Chemical shrinkage.

Temperature Rise and Final Set Procedure

A Hobart mixer was used to prepare the laboratory experiments. The temperature of the liquids was adjusted prior to mixing with cements to obtain a specific mix temperature. About 280 g of cement mortar was placed in a 6 ounces Styrofoam cup inside an insulated Styrofoam box.

Temperature response for all mixes was measured continuously using a computerized data collection program by placing a thermocouple in the middle of the sample through a hole on the top. The maximum temperature rise rate, as well as the maximum temperature and time to maximum temperature reached were used as indicators of the reactivity of the experimental mixtures. Initial and final set times were determined with Gillmore needles according to ASTM C266. The target is to reach a final set within 5 to 7 minutes after mixing.

Cube Compressive Strength Procedure

Cube specimens were cast simultaneously and kept inside a sealed plastic bag containing a moist towel at a temperature of 68° C. (154° F.) until the time of the test. The cube compressive strength (CCS) of at least three cubes from each mix was measured. The maximum load required to crush the cubes was measured using a SATEC UTC 120HVL compression machine, which was programmed to meet the rate of loading specified by procedure ASTM C109.

Chemical Shrinkage Method

Bulk chemical shrinkage of cement and fly ash pastes at atmospheric pressure and room temperature was measured by the following method: The cement or fly ash paste is mixed by hand with a spatula. The sample is weighed before and after the test ends to detect any possible flaws in the rubber membrane encasing the sample. The cement or fly ash paste (no aggregate) is placed in a water tight rubber balloon, which is put into a closed vessel completely filled with water. The mixing room was kept at a constant temperature of 73° F. and 50% relative humidity. The vessel was closed with a rubber stopper with inserted graduated pipette. A small plastic bag was placed atop the pipette to minimize evaporation from the pipette opening. The procedure was repeated without any cement or fly ash sample to ensure the stability or consistency of the method and the ability to maintain the initial water height in the absence of any sample. The water level near the top of the pipette was recorded as the initial water height. The water height was recorded initially every 10 minutes then every 30 minutes or every 2 hr for the first 12-14 hrs and final data was collected the following morning after 20-24 hrs. For this example mixtures were cast using room temperature water. The reported shrinkage begins from zero at one hour age, and does not include the first hour shrinkage. For each composition at least two runs were conducted to ensure reproducibility. The data reported is the average shrinkage.

Examples 1-6 Using Holcim Cement

Example 1

Mixture proportions in TABLE 3 were used in for the tests in this example. Mix 1—3.0% Potassium citrate 0% STMP, Mix 2—3.0% potassium Citrate, 0.15% STMP, Mix 3—3.0% Potassium Citrate, 0.60% STMP, Mix4—3.0% Potassium Citrate, 0.90% STMP.

TABLE 3

| Sample ID | Holcim Cement | Gypsum | Potassium Citrate | STMP | CCS psi |
|---|---|---|---|---|---|
| | | Weight (g) | | | |
| Mix 1 | 500 | 0 | 15 | 0 | 2415 |
| Mix 2 | 500 | 0 | 15 | 0.75 | 8747 |
| Mix 3 | 500 | 0 | 15 | 3.0 | 3351 |
| Mix 4 | 500 | 0 | 15 | 4.5 | 2367 |

The temperature rise data for mixtures with Holcim cement with 3% potassium citrate at various levels of STMP is included in Table 4. From this data we notice that when STMP is zero, it takes about 45 minutes for the temperature to start rising and over 70 min.

TABLE 4

TRS Data for mixtures from Table 3 in Example 1

| Sample ID | Fluidity | Final Set time min | Initial Temp. ° F. | Max. Temp. ° F. | Time to Max Temp. min | Max rate of temp. rise ° F./min | Time to Max rate min | Max. Rise ° F. |
|---|---|---|---|---|---|---|---|---|
| Mix 1 | 4 | long | 116.7 | 159.7 | 70.58 | 4.3 | 47.67 | 43.0 |
| Mix 2 | 4 | 10.0 | 116.5 | 192.8 | 100.42 | 8.2 | 5.75 | 76.3 |
| Mix 3 | 4 | 6.5 | 117.8 | 183.2 | 136.75 | 9.4 | 2.25 | 65.4 |
| Mix4 | 4.5 | 7.0 | 119.5 | 177.4 | 153.17 | 8.2 | 1.92 | 57.9 |

By contrast, when STMP is added the mixture temperate start rising immediately after mixing and continues to rise for the next 3 to 4 hours. The faster reactivity with the presence of STMP results in setting times in the range of 7 to 10 minutes, compared to about 2 hours for mixtures without STMP to reach final set.

Example 2

Mixture proportions in TABLE 5 were used in for the tests in this example. Mixtures contain the Holcim cement with 0.60% STMP at various potassium citrate levels. Mix 5—0.750% Potassium citrate 0.60% STMP, Mix 6—1.75% potassium Citrate, 0.60% STMP, Mix 3—3.0% Potassium Citrate, 0.60% STMP, Mix7—4.5% Potassium Citrate, 0.60% STMP

TABLE 5

Mixtures for Example 2

| Sample ID | Holcim Cement | Gypsum | Potassium Citrate | STMP | CCS psi |
|---|---|---|---|---|---|
| | Weight (g) | | | | |
| Mix 5 | 500 | 0 | 3.75 | 3.0 | 6627 |
| Mix 6 | 500 | 0 | 7.5 | 3.0 | 1182 |
| Mix 3 | 500 | 0 | 15 | 3.0 | 3351 |
| Mix7 | 500 | 0 | 22.5 | 3.0 | 4934 |

Figure 3:
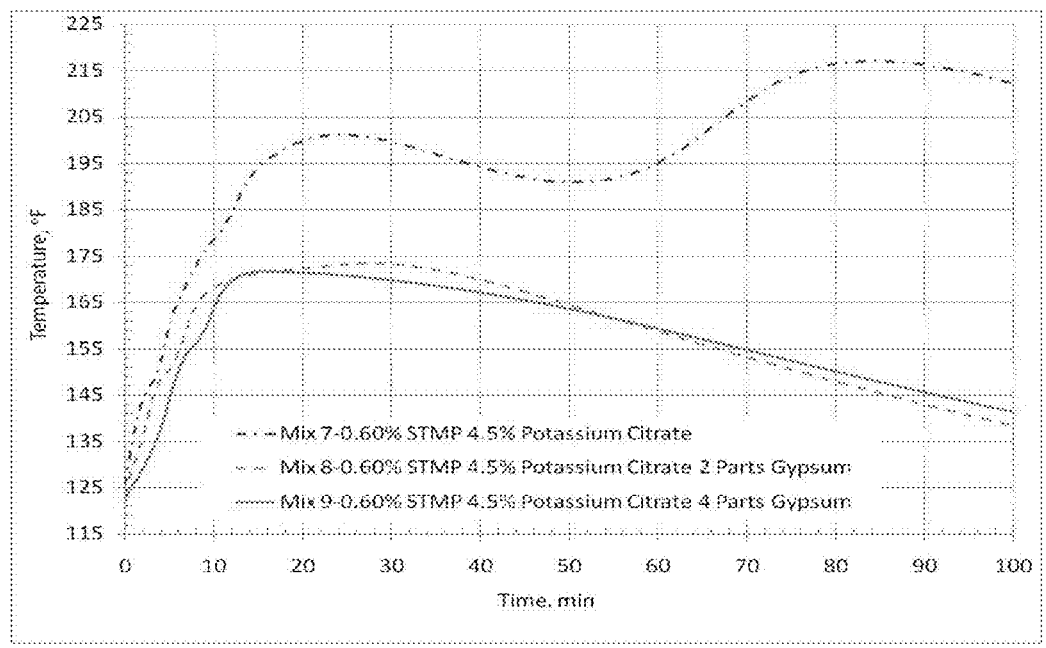
FIG. 3 is a graph of the results of TABLE showing the effect of Temperature rise for mixtures containing Holcim cement with 0.60% STMP and at various gypsum dosages.
Figure 4:
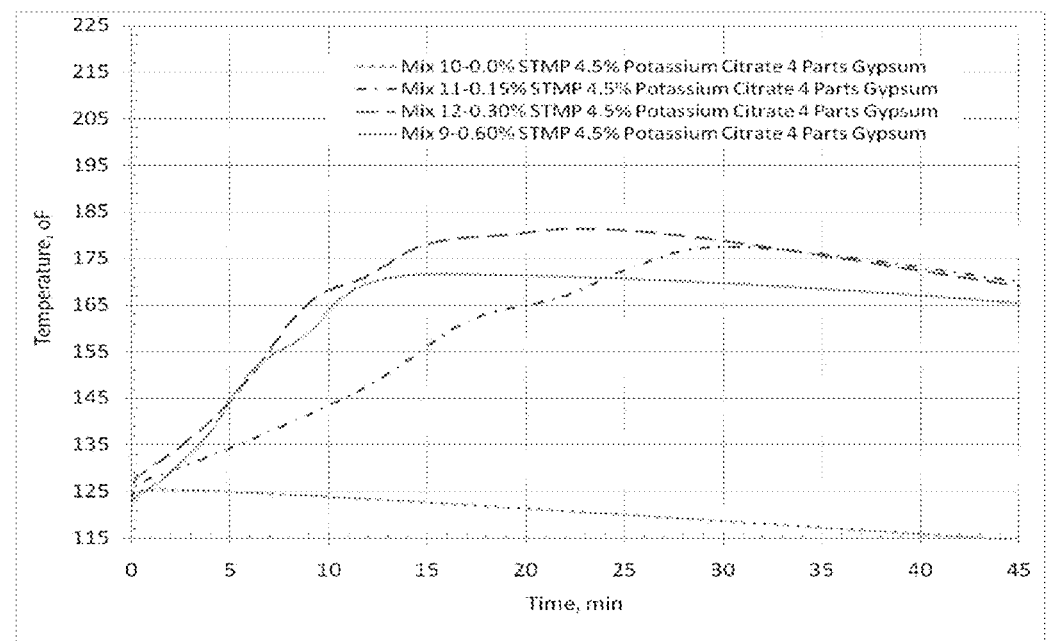
FIG. 4 is a graph of temperature rise plots for mixtures with 100 parts Holcim cement plus 4 parts gypsum, with 4.5% potassium citrate and at various STMP dosages.
Figure 5:
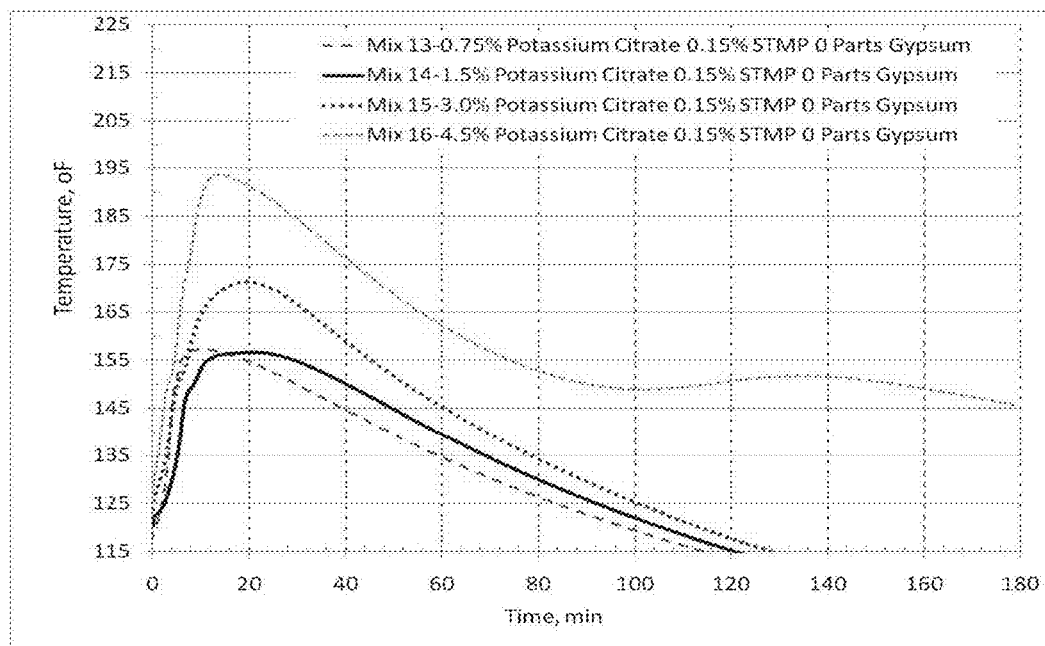
FIG. 5 is a graph of temperature rise for mixtures containing 100 parts Holcim cement and zero gypsum, with 0.15% STMP and at various potassium citrate dosages.
Figure 6:
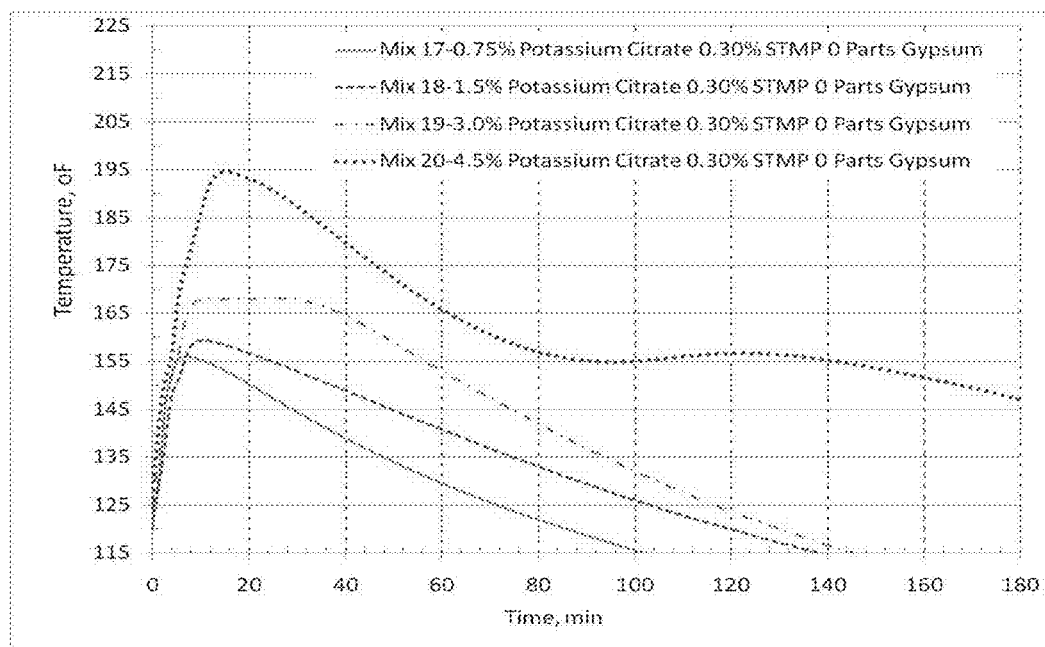
FIG. 6 is a graph of Temperature rise for mixtures with 100 parts Holcim cement and zero gypsum, with 0.30% STMP and at various potassium citrate dosages.

The temperature plots for mixtures with Holcim cement with increasing amounts of potassium citrate (3.0 and 4.5%) achieved a relatively high temperature rise compared to mixtures with lower citrate (0.75 and 1.5%) shown in the graph in FIG. 3. In addition, two or three distinct peaks indicating more than one reaction occurred as the citrate amount increased, unlike mixes with lower citrate amounts which show a single peak within 12 minutes. As shown in the results in TABLE 6, the temperature rise was a maximum of about 183° F. and 217° F. for mixtures with 3.0 and 4.5% potassium citrate compared to 159° F. and 154° F. for mixtures with 0.75% and 1.5% citrate.

TABLE 6

TRS Data for mixtures from Table 5 for Example 2

| Sample ID | Fluidity | Final Set Time min | Initial Temp. ° F. | Max. Temp. ° F. | Time to Max Temp. min | Max rate of temp. ° F./min | Time to Max rate min | Max. Rise ° F. |
|---|---|---|---|---|---|---|---|---|
| Mix 5 | 2 | 5.7 | 116.2 | 158.6 | 11.5 | 9.6 | 3.3 | 42.4 |
| Mix 6 | 4 | 6.8 | 119.8 | 153.6 | 11.7 | 7.2 | 2.7 | 33.8 |
| Mix 3 | 4 | 6.5 | 120.0 | 183.2 | 136.8 | 9.4 | 2.1 | 63.2 |
| Mix7 | 4.5 | 5.0 | 125.8 | 217.1 | 83.7 | 12.0 | 0.8 | 91.3 |

Example 3

Mixture proportions with the Holcim cement with various levels of gypsum are included in TABLE 7 with the following composition: Mix7—4.50% Potassium citrate 0.60% STMP; 0 gypsum, Mix 8—4.5% potassium Citrate, 0.60% STMP; 2 parts gypsum, Mix 9—4.5% Potassium Citrate, 0.60% STMP; 4 parts gypsum

TABLE 7

| Sample ID | Holcim Cement | Gypsum | Potassium Citrate | STMP | CCS psi |
|---|---|---|---|---|---|
| | Weight (g) | | | | |
| Mix 7 | 500 | 0 | 22.5 | 3.0 | 4934 |
| Mix 8 | 490.2 | 9.8 | 22.5 | 3.0 | 4980 |
| Mix 9 | 480.8 | 19.2 | 22.5 | 3.0 | 3309 |

Maximum temperature plots included in FIG. 3 show that the maximum temperature is reduced for mixtures gypsum compared to mixtures without gypsum. The reduction in maximum temperature did not have a significant effect on final setting time as shown in the data in TABLE 8. It was also noted that the two inflection points did not change significantly, suggesting that the reactions responsible for hardening remained the same. These results are attributed to the relatively high amounts of potassium citrate (4.5%) and STMP (0.6%).

TABLE 8

TRS Data for mixtures from Table 7

| Sample ID | Fluidity | Final Set min | Initial Temp. (° F.) | Max. Temp. (° F.) | Time to Max Temp. (min) | Max rate of temp. (° F./min) | Time to Max rate (min) | Max. Rise (° F.) |
|---|---|---|---|---|---|---|---|---|
| Mix 7 | 4 | 5.0 | 125.8 | 217.1 | 83.7 | 12.0 | 0.8 | 91.3 |
| Mix 8 | 4 | 5.0 | 123.3 | 173.5 | 27.75 | 8.4 | 2.17 | 50.2 |
| Mix 9 | 4 | 8.0 | 122.0 | 171.8 | 15.67 | 7.2 | 4.42 | 49.8 |

Example 4

Mixture proportions for example 4 are included in TABLE 9. These mixtures contain the Holcim cement with 4 parts gypsum at various levels of STMP. Mix 9—0.60% STMP 4.5% Potassium citrate 4 parts Gypsum, Mix10—4.50% Potassium citrate 0.0% STMP; 4 parts gypsum, Mix 11—4.5% potassium Citrate, 0.15% STMP; 4 parts gypsum; Mix 12—4.5% Potassium Citrate, 0.30% STMP; 4 parts gypsum.

TABLE 9

(Mixtures proportions for Example 4)

| Sample ID | Holcim Cement | Gypsum | Potassium Citrate | STMP | Compressive Strength psi |
|---|---|---|---|---|---|
| | | Weight (g) | | | |
| Mix 9 | 480.8 | 19.2 | 22.5 | 3.0 | 3309 |
| Mix10 | 480.8 | 19.2 | 22.5 | 0 | 109 |
| Mix 11 | 480.8 | 19.2 | 22.5 | 0.75 | 3794 |
| Mix 12 | 480.8 | 19.2 | 22.5 | 1.50 | 8694 |

TABLE 10

From TRS data for Mixes 9-12 of TABLE 9

| Sample ID | Fluidity | Final Set min | Initial Temp. (° F.) | Max. Temp. (° F.) | Time to Max Temp. min | Max rate of temp. (° F./min) | Time to Max rate (min) | Max. Rise (° F.) |
|---|---|---|---|---|---|---|---|---|
| Mix 10 | 4 | 150 | 123.0 | | | | | |
| Mix 11 | 4 | 14.5 | 123.0 | 177.6 | 29.6 | 3.1 | 0.4 | 54.6 |
| Mix 12 | 5 | 9.5 | 121.6 | 181.5 | 22.6 | 7.2 | 6.3 | 59.9 |
| Mix 9 | 4 | 8.0 | 122.0 | 171.8 | 15.67 | 7.2 | 4.42 | 49.8 |

From data in Table 9 we notice that mixtures containing 100 parts Holcim, 4 parts gypsum require at least 0.30% STMP even if potassium citrate is high (4.5%) before achieving a sharp temperature rise and final set time of 10 minutes. In addition, mixture without STMP (Mix10) attained a final set close to 3 hrs and the temperature rise never developed achieving a final set close to 3 hrs.

Example 5

Mixtures of 100 parts Holcim cement and zero gypsum with 0.15% STMP and various levels of potassium citrate are included in Table 11.

TABLE 11

Mixtures used in Example 5

| Sample ID | Holcim Cement | Gypsum | Potassium Citrate | STMP | CCS psi |
|---|---|---|---|---|---|
| | | Weight (g) | | | |
| Mix 13 | 500.0 | 0 | 3.75 | 0.75 | 10541 |
| Mix 14 | 500.0 | 0 | 7.5 | 0.75 | 9273 |
| Mix 15 | 500.0 | 0 | 15.0 | 0.75 | 9097 |
| Mix 16 | 500.0 | 0 | 22.5 | 0.75 | 9191 |

TABLE 12

TRS data for the mixtures of Table 11 (Example 5)

| Sample ID | Fluidity | Final Set Time min | Initial Temp. ° F. | Max. Temp. ° F. | Time to Max Temp. min | Max rate of temp. ° F./min | Time to Max rate min | Max. Rise ° F. |
|---|---|---|---|---|---|---|---|---|
| Mix 13 | 4.0 | 6.0 | 117.6 | 157.3 | 9.3 | 15.6 | 3.7 | 39.7 |
| Mix 14 | 3.5 | 10.0 | 120.3 | 156.7 | 19.2 | 9.6 | 5.8 | 36.4 |
| Mix 15 | 4.5 | 7.0 | 122.3 | 171.4 | 19.0 | 9.6 | 3.5 | 49.1 |
| Mix 16 | 3.5 | 4.5 | 125.0 | 193.7 | 13.2 | 10.8 | 5.0 | 68.7 |

Unlike the mixtures in Example 4, mixture in this example which did not use gypsum, require relatively low levels of potassium citrate even at relatively low levels of STMP (0.15%) and the various mixtures reach final setting times within 10 minutes. The highest reaction rates are achieved at the highest potassium citrate of 4.5%, reaching final setting times within 4.5 minutes.

Example 6

The fly ash free mixtures were prepared in the proportions in TABLE 13 using 100 parts Holcim cement, 0.30% STMP, no gypsum and various amounts of potassium Citrate. Mix 17—0.75% Potassium citrate 0.30% STMP, 0 Gypsum; Mix 18—1.5% potassium Citrate, 0.30% STMP; Mix 19—3.0% Potassium Citrate, 0.30% STMP; Mix20—4.5% Potassium Citrate, 0.30% STMP. TABLE 14 includes the TRS data for the mixtures in TABLE 13. Mixtures in this example paralleled the temperature rise behavior of mixtures in Example 5. The present mixtures with 0.30% STMP and no gypsum require relatively low levels of potassium citrate (0.75% and 1.5%) to reach final setting times within 5 minutes, which is faster than the setting times of 6 to 10 minutes for mixtures in example 5 with similar levels of citrate.

TABLE 13

Mixtures used in Example 6

| Sample ID | Holcim Cement (g) | Gypsum (g) | Potassium Citrate (g) | STMP (g) | Compressive Strength (psi) |
|---|---|---|---|---|---|
| Mix 17 | 500 | 0 | 3.75 | 1.5 | 5897 |
| Mix 18 | 500 | 0 | 7.5 | 1.5 | 7590 |
| Mix 19 | 500 | 0 | 15 | 1.5 | 8475 |
| Mix 20 | 500 | 0 | 22.5 | 1.5 | 8444 |

TABLE 14

TRS data for mixtures in Example 3

| Sample ID | Fluidity | Final Set min | Initial Temp. ° F. | Max. Temp. ° F. | Time to Max Temp. min | Max rate of temp. ° F./min | Time to Max rate min | Max. Rise ° F. |
|---|---|---|---|---|---|---|---|---|
| Mix17 | 3 | 4.5 | 119.7 | 155.9 | 6.4 | 15.4 | 2.1 | 36.2 |
| Mix 18 | 3 | 5.0 | 119.7 | 159.4 | 10.0 | 9.6 | 3.1 | 39.7 |
| Mix 19 | 3 | 4.5 | 124.9 | 168.2 | 23.6 | 10.3 | 2.3 | 43.3 |
| Mix 20 | 3 | 4.0 | 125.0 | 194.7 | 14.9 | 13.0 | 0.3 | 69.7 |

CCS with Holcim Cement

Figure 7:
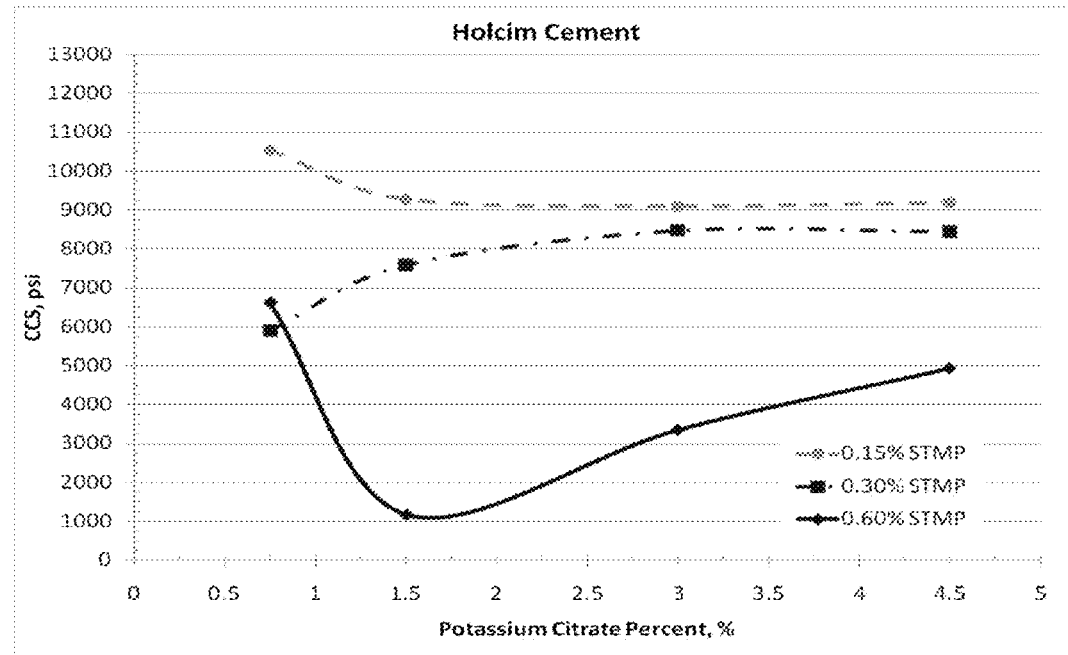
FIG. 7 is a graph of cube compressive strength measured after 24 hr for mixtures with Holcim cement with zero parts gypsum, with various potassium citrate dosages and various STMP levels.

The cube compressive strength (CCS) measured after 24 hours and 7 days curing for mixtures in examples 1 through 6 with Holcim cement, with and without gypsum, and with various amounts of STMP and potassium citrate are summarized in TABLE 15. The data for mixtures without gypsum is plotted in the graph in FIG. 7. From the plot in FIG. 7 and the final setting times, the optimum mixtures are obtained when STMP level is between 0.15% and 0.30%. Mixture with 0.60% STMP hardens too fast and exhibits a sharp reduction in compressive strength.

TABLE 15

| Mixture ID | Holcim Cement Weight (g) | Gypsum Weight (g) | Potassium Citrate Weight % | STMP Weight % | 24 hr CCS psi | 7 day CCS psi |
|---|---|---|---|---|---|---|
| Mix 13 | 500 | 0 | 0.75 | 0.15 | 10541 | 6966 |
| Mix 14 | 500 | 0 | 1.5 | 0.15 | 9273 | 11189 |
| Mix 15 | 500 | 0 | 3.0 | 0.15 | 9097 | 11840 |
| Mix 16 | 500 | 0 | 4.5 | 0.15 | 9191 | 11479 |
| Mix 17 | 500 | 0 | 0.75 | 0.30 | 5897 | 9693 |
| Mix 18 | 500 | 0 | 1.5 | 0.30 | 7590 | 10611 |
| Mix 19 | 500 | 0 | 3.0 | 0.30 | 8475 | 11440 |
| Mix 20 | 500 | 0 | 4.5 | 0.30 | 8444 | 10751 |
| Mix 5 | 500 | 0 | 0.75 | 0.60 | 6627 | 9693 |
| Mix 6 | 500 | 0 | 1.5 | 0.60 | 1182 | 5734 |
| Mix 3 | 500 | 0 | 3.0 | 0.60 | 3351 | 7573 |
| Mix 7 | 500 | 0 | 4.5 | 0.60 | 4934 | 8934 |
| Mix1 | 500 | 0 | 3.0 | 0 | 2415 | 9133 |
| Mix 2 | 500 | 0 | 3.0 | 0.15 | 8747 | 10161 |
| Mix 3 | 500 | 0 | 3.0 | 0.60 | 3351 | 7573 |
| Mix 4 | 500 | 0 | 3.0 | 0.90 | 2367 | 7244 |
| Mix 7 | 500 | 0 | 4.5 | 0.60 | 4934 | 8934 |
| Mix 8 | 490.2 | 9.8 | 4.5 | 0.60 | 4980 | 8867 |
| Mix 9 | 480.8 | 19.2 | 4.5 | 0.60 | 3309 | 8133 |
| Mix 10 | 480.8 | 19.2 | 4.5 | 0 | 109 | 156 |
| Mix 11 | 480.8 | 19.2 | 4.5 | 0.15 | 3794 | 10227 |
| Mix 12 | 480.8 | 19.2 | 4.5 | 0.30 | 8694 | 8151 |

Lehigh Cement (Examples 7-10)

Example 7

Fly ash free mixture proportions used in this example are included in Table 16 containing Lehigh (Union Bridge) cement, zero gypsum, 3.0% potassium citrate and various levels of STMP. Mix 1—3.0% Potassium Citrate 0% STMP; Mix 2—3.0% Potassium Citrate 0.15% STMP; Mix 3—3.0% Potassium Citrate 0.30% STMP; Mix 4—3.0% Potassium Citrate 0.60% STMP

TABLE 16

Mixtures used in Example 7

| Sample ID | Lehigh Cement | Gypsum | Pot Citrate | STMP | CCS psi |
|---|---|---|---|---|---|
| | Weight, g | | | | |
| Mix 1 | 500 | 0 | 15 | 0 | 9928 |
| Mix 2 | 500 | 0 | 15 | 0.75 | 9563 |
| Mix 3 | 500 | 0 | 15 | 1.5 | 8340 |
| Mix 4 | 500 | 0 | 15 | 3.0 | 3348 |

TABLE 17

TRS data for mixtures used in Example 7

| MIX ID | Fluidity | Final set time min | Initial temp °F. | Max Temp | Time to max temp min | Max Rate of temp °F./min | Time to max rate min | Max Rise °F. |
|---|---|---|---|---|---|---|---|---|
| Mix 1 | 3 | 40.0 | 121.9 | 176.8 | 55.0 | 1.0 | 5.3 | 54.9 |
| Mix 2 | 3.5 | 7.0 | 125.0 | 193.7 | 23.1 | 12.0 | 3.2 | 68.7 |
| Mix 3 | 2.5 | 5.5 | 124.0 | 185.6 | 28.0 | 13.2 | 1.9 | 61.6 |
| Mix 4 | 1.5 | 3.5 | 126.4 | 166.2 | 7.2 | 14.4 | 1.0 | 39.8 |

Figure 8:
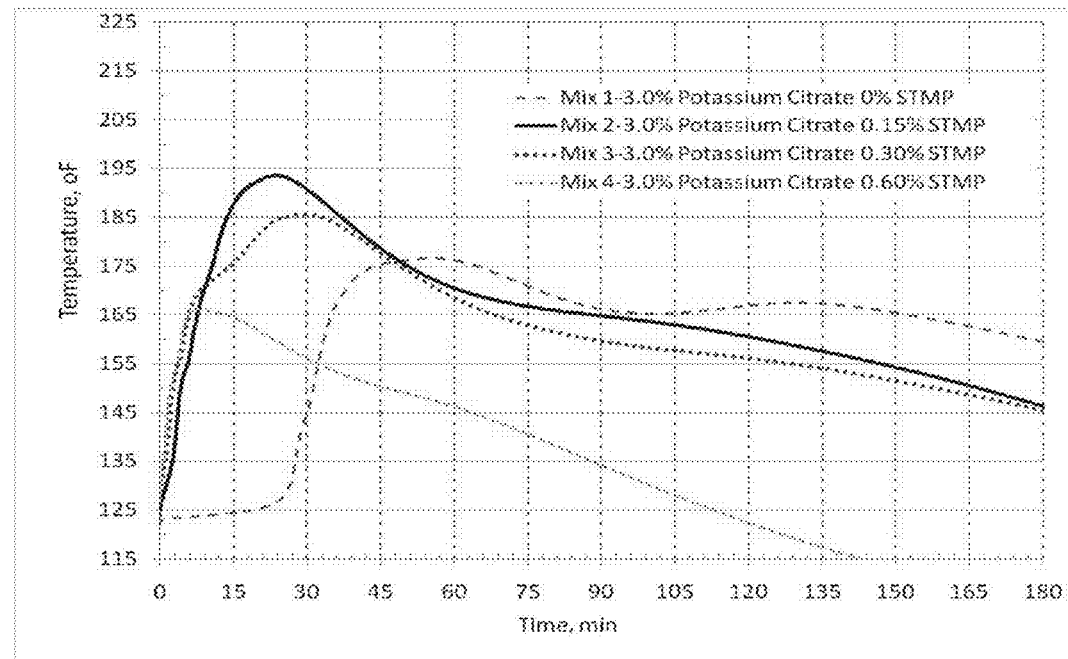
FIG. 8 is a graph of temperature plots for mixtures with Lehigh cement with zero gypsum, with 3.0% potassium citrate at various STMP dosages.
Figure 9:
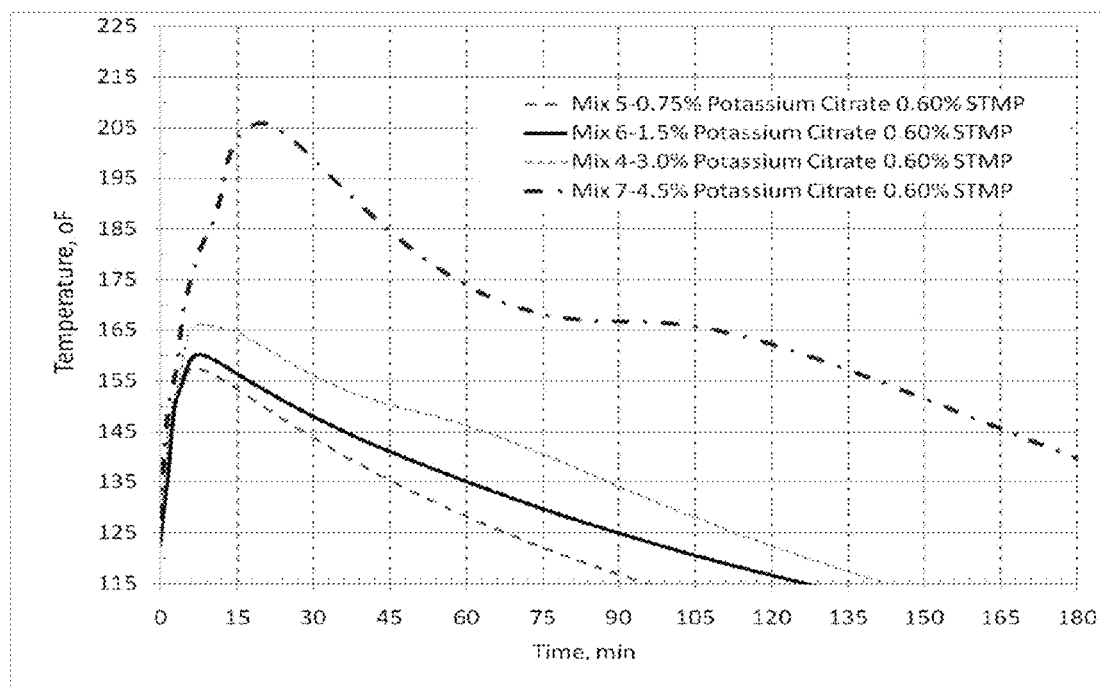
FIG. 9 is a graph of TRS plot for mixtures with Lehigh cement and zero gypsum, with 0.60% STMP with various potassium citrate levels.

A comparison of mixtures Lehigh cement in this example to mixtures in example 1 we notice that the mixtures with 0% STMP behave slightly different. From FIG. 8 we notice that mixtures with the Lehigh cement with 0% STMP, the temperature never drops below the initial temperature and it reaches 145° F. within 30 minutes. By contrast mixture with 0% STMP with the Holcim cement the temperature drops initially about 10° F. and only start increasing after about 40 minutes and reaching 145° F. about 50 minutes. Therefore mixtures with the Lehigh cement are relatively more reactive and reach final setting times faster in about half the time compared to similar mixtures with the Holcim cement.

Example 8

Mixture proportions used for this example are included in Table 18 for Mix 5—0.60% STMP 0.75% Potassium Citrate; Mix 6—0.60% STMP 1.5% Potassium Citrate; Mix 4—0.60 STMP 3.0% Potassium Citrate; Mix 7—0.60% STMP 4.5% Potassium Citrate. The data included in Table 19 indicates that mixtures in this example with Lehigh cement reach maximum temperature within 7 to 20 minutes which is significantly faster when compared to similar mixtures in example 2 containing the Holcim cement for which the mixes temperature remains relatively high during the first 3 hours. We also notice from Table 19 that final setting times are relatively faster. However the fluidity of these mixes was relatively low.

TABLE 18

Mixtures with Lehigh (Union Bridge) (Example 8).

| Cement | Lehigh Cement | Gypsum | Pot Citrate | STMP | CCS psi |
|---|---|---|---|---|---|
| | Weight, g | | | | |
| Mix 5 | 500 | 0 | 3.75 | 3.0 | 3732 |
| Mix 6 | 500 | 0 | 7.5 | 3.0 | 3655 |
| Mix 4 | 500 | 0 | 15 | 3.0 | 3348 |
| Mix 7 | 500 | 0 | 22.5 | 3.0 | 4097 |

TABLE 19

TRS data for mixtures used Example 8.

| Cement | Fluidity | final set Min | Initial temp °F. | Max Temp | Time to max temp min | Max Rate of temp °F./min | Time to Max Rate min | Max Rise °F. |
|---|---|---|---|---|---|---|---|---|
| Mix 5 | 1.5 | 4.0 | 122.5 | 157.5 | 6.7 | 14.2 | 1.7 | 35.0 |
| Mix 6 | 1.5 | 3.5 | 123.3 | 160.2 | 7.3 | 13.9 | 1.7 | 36.9 |
| Mix 4 | 1.5 | 3.5 | 126.4 | 166.2 | 7.2 | 14.4 | 1.0 | 39.8 |
| Mix 7 | 2.5 | 4.0 | 128.0 | 205.9 | 19.2 | 16.1 | 0.3 | 77.9 |

Example 9

Figure 10:
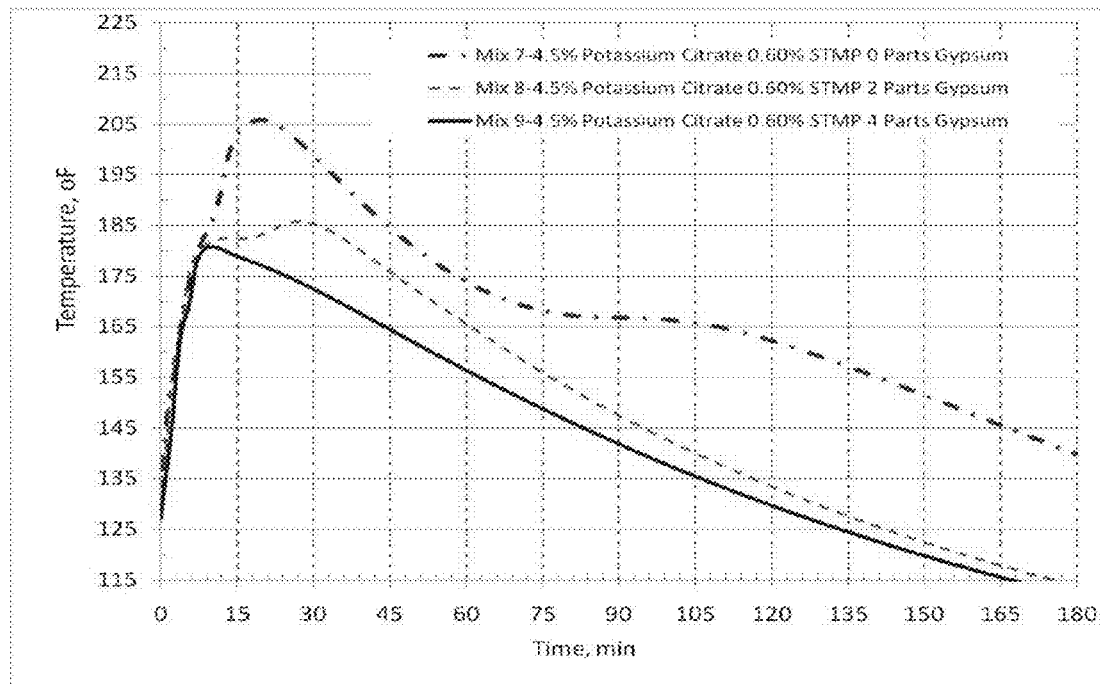
FIG. 10 is a graph of temperature rise for Lehigh cement mixtures with 0.60% STMP and 4.5% potassium citrate and at various gypsum dosages.
Figure 11:
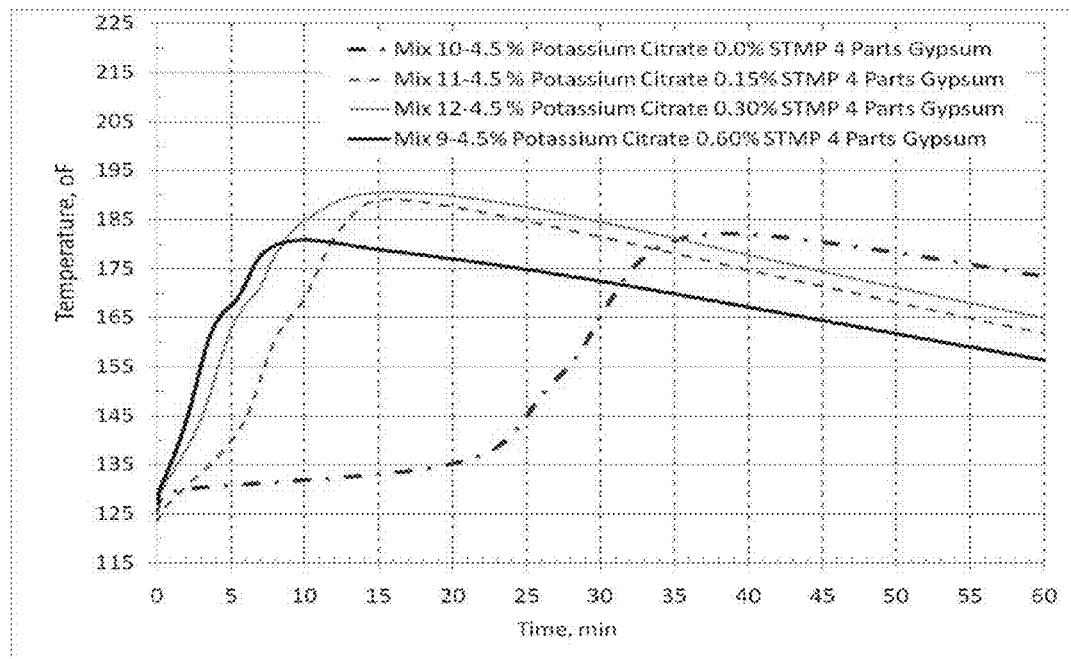
FIG. 11 is a graph of temperature rise for mixtures containing 100 parts Lehigh cement and 4 parts gypsum with 4.5% potassium citrate and at various STMP dosages.

Mixture proportions in Table 20 were used for this example for Mix 7—0.60% STMP 4.5% Potassium Citrate 0 Parts Gypsum; Mix 8—0.60% STMP 4.5% Potassium Citrate 2 Parts Gypsum; Mix 9—0.60% STMP 4.5% Potassium Citrate 4 Parts Gypsum. From FIG. 10 and data in Table 21 it shows that additions of 2 and 4 parts gypsum helps reduce the heat released during the reactions without increasing the setting times with the benefits of improving fluidity and increasing compressive strengths.

TABLE 20

Mixtures for Example 9

| Cement | Lehigh Cement | Gypsum | Pot Citrate | STMP | CCS psi |
|---|---|---|---|---|---|
| | Weight, g | | | | |
| Mix 7 | 500 | 0 | 22.5 | 3.0 | 4097 |
| Mix 8 | 490.2 | 9.8 | 22.5 | 3.0 | 4702 |
| Mix 9 | 480.8 | 19.2 | 22.5 | 3.0 | 5933 |

TABLE 21

TRS data for mixtures of TABLE 20

| Sample ID | Fluidity | final set Min | Initial temp °F. | Max Temp | Time to max temp min | Max Rate of temp °F./min | Time to Max Rate min | Max Rise °F. |
|---|---|---|---|---|---|---|---|---|
| Mix 7 | 2.5 | 4.0 | 128.0 | 205.9 | 19.2 | 16.1 | 0.3 | 77.9 |
| Mix 8 | 3 | 5.0 | 127.0 | 185.8 | 26.6 | 13.9 | 1.7 | 58.8 |
| Mix 9 | 3.5 | 5.0 | 127.0 | 180.8 | 9.8 | 12.7 | 2.8 | 53.8 |

Example 10

Mixtures containing 100 parts Lehigh, 4 parts Gypsum, 4.5% potassium citrate and at various levels of STMP) are included in Table 22 with Mix 10—0.0% STMP 4.5% Potassium Citrate 4 Parts Gypsum; Mix 11—0.15% STMP 4.5% Potassium Citrate 4 Parts Gypsum; Mix 12—0.30% STMP 4.5% Potassium Citrate 4 Parts Gypsum; Mix 9—0.60% STMP 4.5% Potassium Citrate 4 Parts Gypsum. Similarly as observed in example 4 we notice that the effect of adding STMP is to shorten the time at which the temperature starts increasing. Final temperature is similar for the mixtures with the various STMP dosages. From Table 23 we notice that there is a direct correlation between STMP dosage and shorter time to maximum temperature and shorter setting times.

TABLE 22

Mixtures for Example 10.

| Sample ID | Lehigh Cement | Gypsum | Pot Citrate | STMP | CCS psi |
|---|---|---|---|---|---|
| | | Weight, g | | | |
| Mix 10 | 480.8 | 19.2 | 22.5 | 0 | 9802 |
| Mix 11-0 | 480.8 | 19.2 | 22.5 | 7.5 | 9472 |
| Mix 12 | 480.8 | 19.2 | 22.5 | 15.0 | 8698 |
| Mix 9 | 480.8 | 19.2 | 22.5 | 30.0 | 5933 |

TABLE 23

TRS data for mixtures 9-12 of TABLE 22

| Sample ID | Fluidity | final set min | Initial temp ° F. | Max Temp ° F. | Time to max temp | Max Rate of temp ° F./min | Time to Max Rate min | Max Rise ° F. |
|---|---|---|---|---|---|---|---|---|
| Mix 10 | 4 | 23 | 125.5 | 182.3 | 38.3 | 5.8 | 0.3 | 56.8 |
| Mix 11 | 4 | 10.0 | 123.4 | 189.2 | 15.8 | 8.2 | 6.6 | 65.8 |
| Mix 12 | 3.5 | 8 | 126.3 | 190.6 | 15.5 | 10.8 | 4.0 | 64.3 |
| Mix 9 | 3.5 | 5.0 | 127.0 | 180.8 | 9.8 | 12.7 | 2.8 | 53.8 |

St. Mary's Cement (Examples 11-16)

Example 11

Mixtures with St. Mary's cement with 4 parts of gypsum, 3.0% potassium citrate dosages and various STMP dosages. Mixture proportions in Table 24 were used for this example were as follows: Mix 1—0.0% STMP 3.0% Pot. Citrate, Mix 2—0.15% STMP 3.0% Pot. Citrate, Mix 3—0.30% STMP 3.0% Pot Citrate, and Mix 4—0.60% STMP 3.0% Pot. Citrate.

Figure 12:
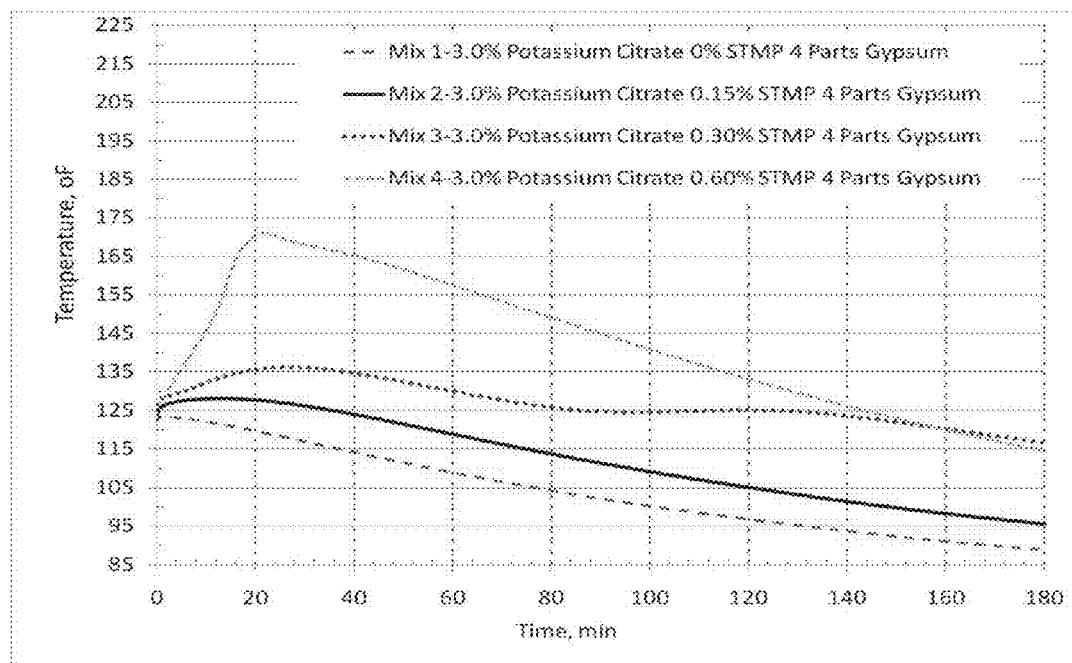
FIG. 12 is a graph of TRS data plotted up to 3 hrs for mixtures with St. Mary's cement with 4 parts of gypsum, 3.0% potassium citrate and various STMP levels.

From the temperature rise behavior and final setting times for mixtures with the St Mary's cement presented in the following examples show that in general mixtures with the St. Mary's cement were the least reactive compared with mixtures with the previous examples with the Holcim and the Lehigh cements. From FIG. 12 we notice the relatively shallow temperature rise or even flat line or decreasing temperatures during the first 3 hours for mixtures containing 4 parts of gypsum and 3.0% potassium citrate with 0%, 0.15%, and 0.30% STMP. From Table 25 we notice that the only mixture with a significant temperature rise measured during the first 20 minutes was for mixture with 0.60% STMP.

TABLE 24

Mixtures with St. Mary's cement for Example 11

| | St Mary's Cement | Gypsum | Potassium Citrate | STMP | CCS psi |
|---|---|---|---|---|---|
| | | Weight, g | | | |
| Mix 1 | 480.8 | 19.2 | 15.0 | 0 | 104 |
| Mix 2 | 480.8 | 19.2 | 15.0 | 0.75 | 2471 |
| Mix 3 | 480.8 | 19.2 | 15.0 | 1.5 | 2443 |
| Mix 4 | 480.8 | 19.2 | 15.0 | 3.0 | 1897 |

TABLE 25

TRS data for mixtures with St. Mary's cement used in Example 11

| Cement | Fluidity | final set min | Initial temp ° F. | Max Temp ° F. | Time to max temp min | Max Rate of temp ° F./min | Time to max rate min | Max Rise ° F. |
|---|---|---|---|---|---|---|---|---|
| Mix 1 | 3 | 90.0 | 122.1 | 123.5 | 0.9 | 1.0 | 4.9 | 1.4 |
| Mix 2 | 3.5 | 41.0 | 123.6 | 128.2 | 10.9 | 2.2 | 0.3 | 4.6 |
| Mix 3 | 4.5 | 32.0 | 124.5 | 136.3 | 24.7 | 2.2 | 0.3 | 11.8 |
| Mix 4 | 4 | 19.0 | 123.3 | 171.2 | 20.9 | 3.6 | 0.3 | 47.9 |

Example 12

Figure 13:
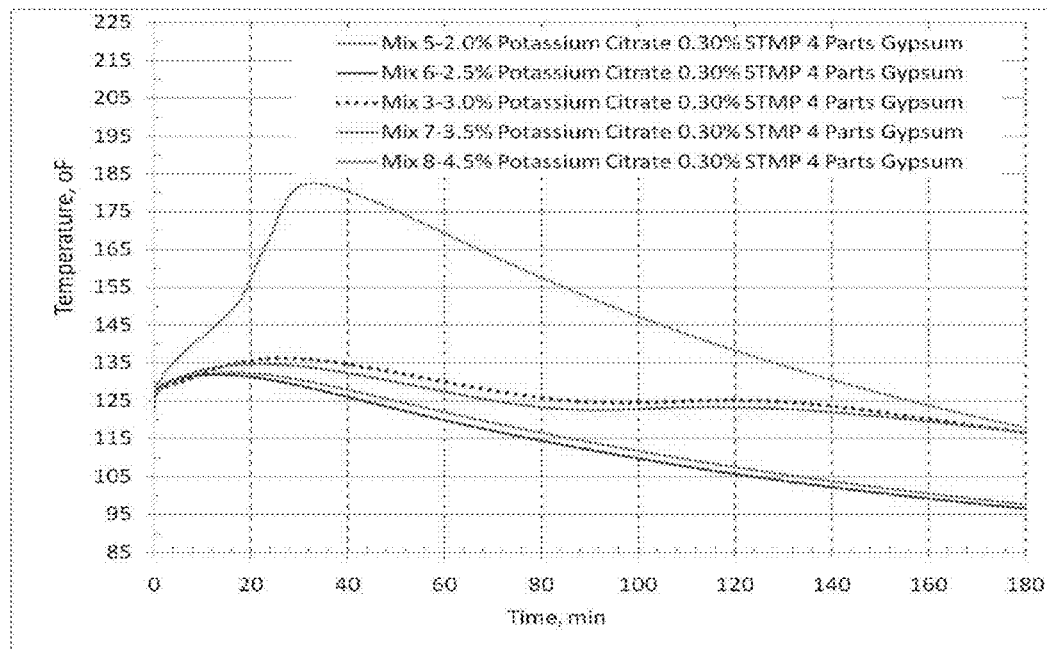
FIG. 13 is a graph of TRS data plotted up to 3 hrs for mixtures with St. Mary's cement with 4 parts gypsum, 0.30% STMP and various potassium citrate dosages.

Mixtures in this example contain St. Mary's cement with 4 parts gypsum, 0.30% STMP and various levels of potassium citrate. Mixture proportions in Table 26 were used for this example with Mix 5—0.30% STMP 2.0% Pot Citrate; Mix 6—0.30% STMP 2.5% Pot Citrate; Mix 3—0.30% STMP 3.0% Pot Citrate; Mix 7—0.30% STMP 3.5% Pot Citrate; Mix 8—0.30% STMP 4.5% Pot Citrate. From the plots shown in FIG. 13 and data included in Table 27 we notice that for mixtures with the St Mary's cement with 4 parts gypsum if we keep the STMP dosage at 0.30% then the potassium citrate dosage has to be increased to 4.5% to affect a significant temperature rise during the first 20 minutes. From this and previous example 11 we can conclude that adding gypsum to mixtures with the St Mary's cement is not desirable.

TABLE 26

Mixtures with St. Mary's cement for Example 12

| | St Mary's Cement | Gypsum | Pot. Citrate | STMP | CCS psi |
|---|---|---|---|---|---|
| | | Weight, g | | | |
| Mix 5 | 480.8 | 19.2 | 10.0 | 1.5 | 3391 |
| Mix 6 | 480.8 | 19.2 | 12.5 | 1.5 | 1882 |
| Mix 3 | 480.8 | 19.2 | 15.0 | 1.5 | 2443 |
| Mix 7 | 480.8 | 19.2 | 17.5 | 1.5 | 3078 |
| Mix 8 | 480.8 | 19.2 | 22.5 | 1.5 | 7400 |

TABLE 27

TRS data for mixtures with St. Mary's for Example 12

| Cement | Fluidity | final set min | Initial temp ° F. | Max Temp ° F. | Time to max temp min | Max Rate of temp ° F./min | Time to max rate min | Max Rise ° F. |
|---|---|---|---|---|---|---|---|---|
| Mix 5 | 3.5 | 38.0 | 124.2 | 132.6 | 15.3 | 3.6 | 0.3 | 8.4 |
| Mix 6 | 3.5 | 41.0 | 123.3 | 131.9 | 10.8 | 4.8 | 0.3 | 8.6 |

TABLE 27-continued

TRS data for mixtures with St. Mary's for Example 12

| Cement | Fluidity | final set min | Initial temp ° F. | Max Temp ° F. | Time to max temp min | Max Rate of temp ° F./min | Time to max rate min | Max Rise ° F. |
|---|---|---|---|---|---|---|---|---|
| Mix 3 | 4.5 | 32.0 | 124.5 | 136.3 | 24.7 | 2.2 | 0.3 | 11.8 |
| Mix 7 | 3.5 | 45.0 | 122.5 | 134.8 | 20.6 | 6.0 | 0.3 | 12.3 |
| Mix 8 | 4 | 25.0 | 124.4 | 182.5 | 32.2 | 6.7 | 0.3 | 58.1 |

Example 13

Figure 14:
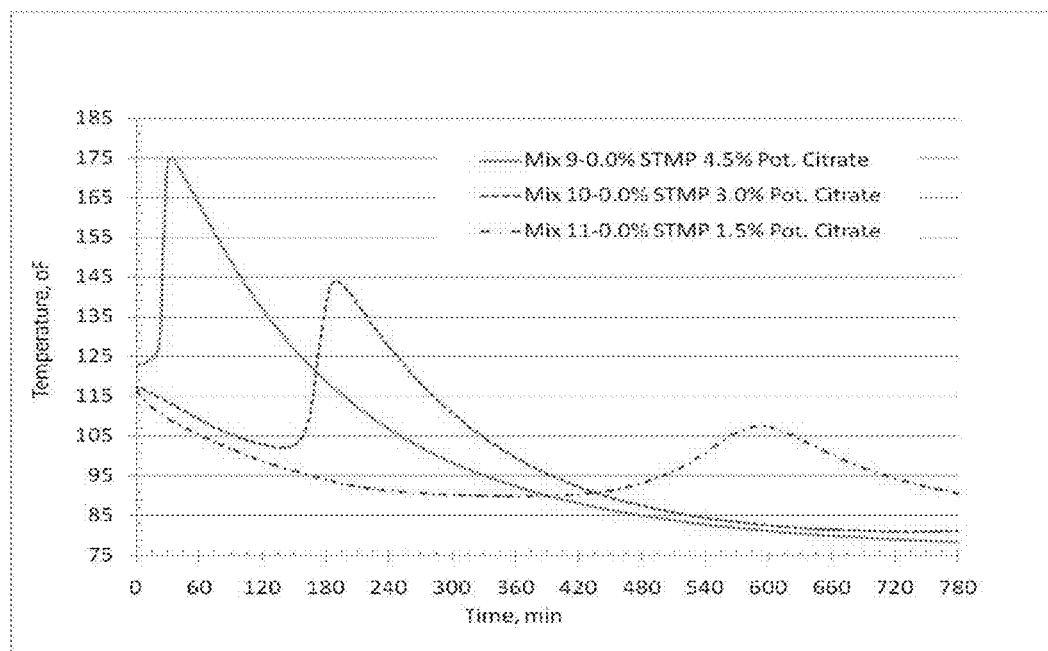
FIG. 14 is a graph of TRS data plots for mixtures with St. Mary's cement and zero parts gypsum, with 0% STMP, with various potassium citrate dosages.

Mixtures with St. Mary's cement with zero gypsum, and without STMP at various potassium citrate dosages were used in this Example. Table 28 includes Mix 9—0.0% STMP 4.5% Potassium Citrate; Mix 10—0.0% STMP 3.0% Potassium Citrate; Mix 11—0.0% STMP 1.5% Potassium Citrate. From FIG. 14 and data in Table 29 it can be seen that potassium citrate can be used to shorten final setting times and reach maximum reaction temperatures in shorter times. However setting times for these mixtures containing the St Mary's cement with 0% STMP have relatively longer setting times compared to previous examples and the best setting time obtained was over 25 minutes for mixtures with 4.5% potassium citrate compared to 5-10 minutes for similar mixtures using the Holcim and Lehigh cements.

TABLE 28

Mixtures with St. Mary's cement for Example 13

| | St Mary's Cement Weight, g | Potassium Citrate |
|---|---|---|
| Mix 9 | 500 | 22.5 |
| Mix 10 | 500 | 15 |
| Mix 11 | 500 | 7.5 |

TABLE 29

TRS data for mixtures in Example 13

| Cement | Fluidity | final set min | Initial temp ° F. | Max Temp ° F. | Time to max temp min | Max Rate of temp ° F./min | Time to max rate min | Max Rise ° F. |
|---|---|---|---|---|---|---|---|---|
| Mix 9 | 3.5 | 26.5 | 121.0 | 175.1 | 33 | 11.5 | 24.42 | 54.1 |
| Mix 10 | 3.5 | 73.0 | 116.5 | 144.1 | 189 | 2.2 | 0.17 | 27.6 |
| Mix 11 | 3.5 | 98.0 | 115.8 | 107.2 | 592 | 1.9 | 0.17 | -8.6 |

Example 14

Figure 15:
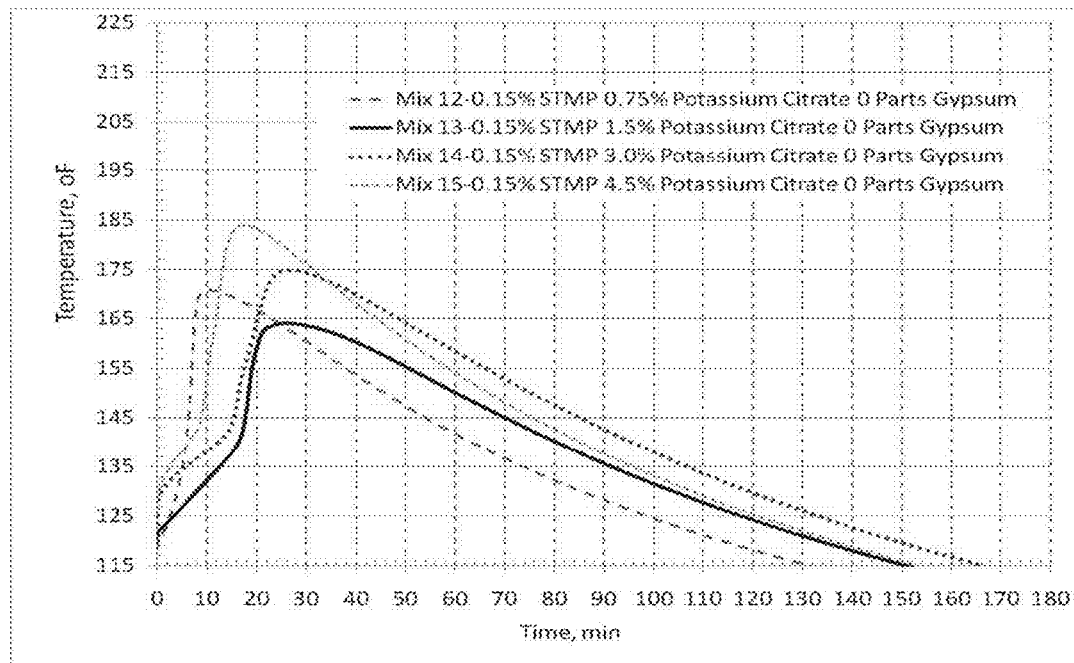
FIG. 15 is a graph of TRS data plots for mixtures St. Mary's cement with zero parts gypsum, with 0.15% STMP at various potassium citrate dosages.

Mixture proportions in Table 30 were used for this example with St. Mary's cement with zero parts gypsum, 0.15% STMP at varied potassium citrate dosages were as follows: Mix 12—0.15% STMP 0.75% Pot Citrate; Mix 13—0.15% STMP 1.5% Pot Citrate; Mix 14—0.15% STMP 3.0% Pot Citrate, and Mix 15—0.15% STMP 4.5% Pot Citrate. From the relatively sharp temperature rise plots included in FIG. 15 we show the importance of adding STMP even at relatively small levels of 0.15%. However there appears to be a different interaction with the potassium citrate compared to previous mixtures with the Holcim and Lehigh cements. We notice that in the present example the shortest setting times are obtained for the mixtures at the lowest (0.75%) and the highest (4.5%) potassium citrate and mixtures with the intermediate citrate dosages of 1.5% and 3.0% actually have longer setting times.

TABLE 30

Mixtures with St. Mary's cement used for Example 14

| | St Mary's Cement Weight (g) | Potassium Citrate | CCS psi |
|---|---|---|---|
| Mix 12 | 500 | 3.75 | 8200 |
| Mix 13 | 500 | 7.5 | 8036 |
| Mix 14 | 500 | 15 | 9210 |
| Mix 15 | 500 | 22.5 | 9335 |

TABLE 31

TRS data for mixtures used in Example 14

| Cement | Fluidity | final set min | Initial temp ° F. | Max Temp ° F. | Time to max temp min | Max Rate of temp (° F./min) | Time to max rate min | Max Rise ° F. |
|---|---|---|---|---|---|---|---|---|
| Mix 12 | 3 | 10.5 | 118.3 | 170.9 | 9.8 | 17.0 | 6.6 | 52.6 |
| Mix 13 | 3.5 | 28.0 | 120.9 | 164.1 | 24.9 | 2.4 | 4.0 | 43.2 |
| Mix 14 | 3.5 | 22.0 | 120.2 | 175.0 | 26.1 | 2.9 | 0.3 | 54.8 |
| Mix 15 | 3.5 | 16.0 | 126.3 | 184.0 | 17.4 | 3.6 | 0.3 | 57.6 |

Example 15

Figure 16:
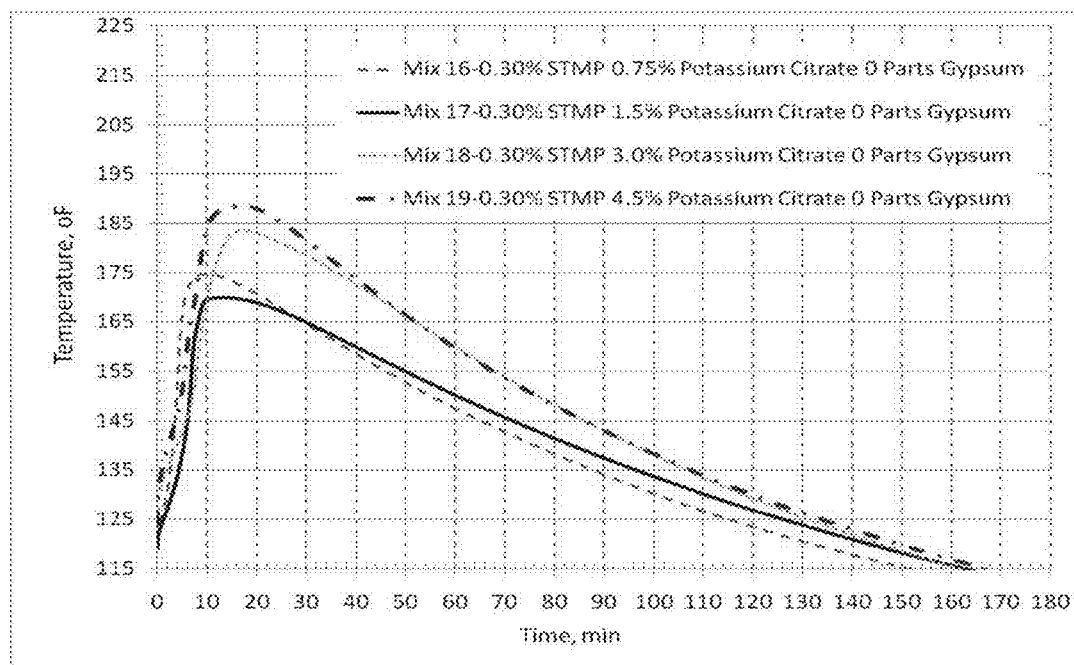
FIG. 16 is a graph of TRS data plot for mixtures with St. Mary's cement with zero parts gypsum, with 0.30% STMP at various potassium citrate dosages.

Mixtures with St. Mary's cement with zero parts gypsum, with 0.30% STMP at various potassium citrate dosages. Mixture proportions in Table 32 were used for this example with Mix 16—0.30% STMP 0.75% Pot citrate; Mix 17—0.30% STMP 1.5% Pot citrate; Mix 18—0.30% STMP 3.0% Pot citrate; Mix 19—0.30% STMP 4.5% Pot citrate. From the temperature rise plots included in FIG. 16, we notice that adding 0.30% STMP further increase the initial rate of temperature rise compared with previous example with 0.15% STMP. Table 33 shows setting times are the shortest for mixtures with 0.75% compared to mixtures with the increased citrate. Therefore, again we notice a different behavior compared to mixtures with the Holcim and Lehigh cements.

TABLE 32

Mixtures with St. Mary's cement used for Example 15

| | St Mary's Cement Weight, g | Potassium Citrate | CCS psi |
|---|---|---|---|
| Mix 16 | 500 | 3.75 | 7649 |
| Mix 17 | 500 | 7.5 | 7348 |
| Mix 18 | 500 | 15 | 7866 |
| Mix 19 | 500 | 22.5 | 9512 |

TABLE 33

TRS data for mixtures in Table 32 for Example 15

| Sample ID | Fluidity | final set min | Initial temp ° F. | Max Temp ° F. | Time to max temp min | Max Rate of temp ° F./min | Time to max rate min | Max Rise ° F. |
|---|---|---|---|---|---|---|---|---|
| Mix 16 | 3 | 6.5 | 121.0 | 174.7 | 9.2 | 22.8 | 4.2 | 53.7 |
| Mix 17 | 3.5 | 15.0 | 119.2 | 170.0 | 13.3 | 13.2 | 6.5 | 50.8 |
| Mix 18 | 4 | 17.5 | 123.1 | 183.5 | 16.7 | 5.8 | 0.3 | 60.4 |
| Mix 19 | 3.5 | 12.0 | 124.0 | 188.8 | 16.4 | 12.5 | 0.3 | 64.8 |

Example 16

Figure 17:
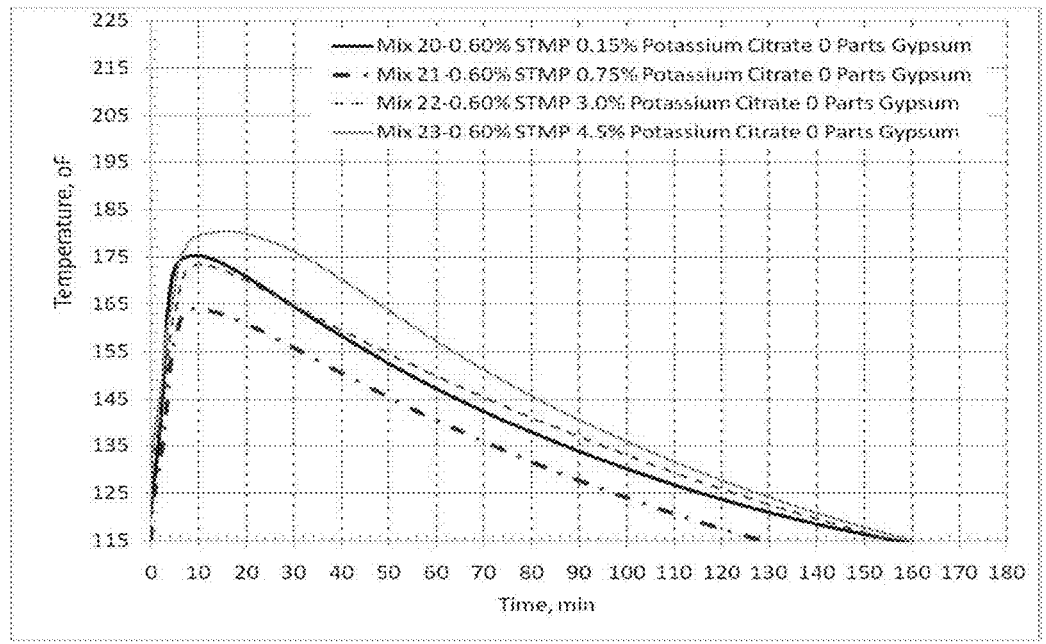
FIG. 17 is a graph of TRS data plot for mixtures with St. Mary's cement with zero parts gypsum, with 0.60% STMP, at various potassium citrate dosages.

Mixtures with St. Mary's cement with zero parts gypsum, with 0.60% STMP, at various potassium citrate dosages. Mixture proportions in Table 34 were used for this example with Mix 20—0.60% STMP 0.75% Pot Citrate; Mix 21—0.60% STMP 1.5% Pot Citrate; Mix 22—0.60% STMP 3.0% Pot Citrate, and Mix 23—0.60% STMP 4.5% Pot Citrate. From the temperature rise plots included in FIG. 17 and the final setting data and temperature rise parameters included in Table 35 we notice that these mixtures with the St Mary's cement containing 0.60% STMP with potassium citrate of 0.75%, 1.5%, 3.0%, and 4.5% are basically done reacting and reach a maximum temperature between 9 to 14 minutes and final setting within 4.5 to 6.5 minutes.

TABLE 34

Mixtures with St. Mary's cement used for Example 16

| Sample ID | St Mary's Cement Weight, g | Potassium Citrate | STMP | CCS psi |
|---|---|---|---|---|
| Mix 20 | 500 | 3.75 | 3.0 | 5047 |
| Mix 21 | 500 | 7.5 | 3.0 | 3715 |
| Mix 22 | 500 | 15 | 3.0 | 5522 |
| Mix 23 | 500 | 22.5 | 3.0 | 2107 |

TABLE 35

TRS data for mixtures with St. Mary's cement used for Example 16

| Sample ID | Fluidity | Final set time min | Initial Temp. ° F. | Max Temp. ° F. | Time to max temp min | Max Rate of temp ° F./min | Time to max rate min | Max Rise ° F. |
|---|---|---|---|---|---|---|---|---|
| Mix 20 | 2.5 | 4.5 | 122.0 | 175.3 | 9.6 | 18.0 | 2.6 | 53.3 |
| Mix 21 | 2 | 4.5 | 115.5 | 164.1 | 8.7 | 14.4 | 3.8 | 48.6 |
| Mix 22 | 3 | 6.5 | 120.0 | 173.5 | 10.3 | 17.8 | 0.3 | 53.5 |
| Mix 23 | 3 | 5.5 | 124.0 | 180.4 | 14.8 | 12.2 | 0.3 | 56.4 |

CCS with St Mary's Cement

Cube compressive strength measured after 24 hr and 7 days curing for mixtures in examples 11 through 16 made with St Mary's cement, both with and without gypsum, with various STMP and potassium citrate amounts are summarized in Table 36. While these plots show that the optimum strengths are obtained for mixtures with STMP level between 0.15% and at 0.30%, with mixtures with 0.60% STMP, the compressive strength is not reduced as dramatically as in the case of the Holcim cement.

TABLE 36

| Mixtures ID | St. Mary's Cement g | Gypsum parts | Pot Citrate Weight % | STMP Weight % | 24-hr CCS Psi | 7-Days CCS Psi |
|---|---|---|---|---|---|---|
| Mix 12 | 500 | 0 | 0.75 | 0.15 | 8200 | 8845 |
| Mix 13 | 500 | 0 | 1.5 | 0.15 | 8036 | 8558 |
| Mix 14 | 500 | 0 | 3.0 | 0.15 | 9210 | 10713 |
| Mix 15 | 500 | 0 | 4.5 | 0.15 | 9335 | 10418 |
| Mix 16 | 500 | 0 | 0.75 | 0.30 | 7649 | 8380 |
| Mix 17 | 500 | 0 | 1.5 | 0.30 | 7348 | 8525 |
| Mix 18 | 500 | 0 | 3.0 | 0.30 | 7866 | 8778 |
| Mix 19 | 500 | 0 | 4.5 | 0.30 | 9512 | 9629 |
| Mix 20 | 500 | 0 | 0.75 | 0.60 | 5047 | 7555 |
| Mix 21 | 500 | 0 | 1.5 | 0.60 | 3715 | 5341 |
| Mix 22 | 500 | 0 | 3.0 | 0.60 | 5522 | 7074 |
| Mix 23 | 500 | 0 | 4.5 | 0.60 | 2107 | 6656 |
| Mix 1 | 480.8 | 19.2 | 15.0 | 0 | 104 | 157 |
| Mix 2 | 480.8 | 19.2 | 15.0 | 0.75 | 2471 | 9906 |
| Mix 3 | 480.8 | 19.2 | 15.0 | 1.5 | 2443 | 8647 |
| Mix 4 | 480.8 | 19.2 | 15.0 | 3.0 | 1897 | 8558 |
| Mix 5 | 480.8 | 19.2 | 10.0 | 1.5 | 3391 | 8809 |
| Mix 6 | 480.8 | 19.2 | 12.5 | 1.5 | 1882 | 8950 |
| Mix 3 | 480.8 | 19.2 | 15.0 | 1.5 | 2443 | 8647 |
| Mix 7 | 480.8 | 19.2 | 17.5 | 1.5 | 3078 | 8077 |
| Mix 8 | 480.8 | 19.2 | 22.5 | 1.5 | 7400 | 10633 |

Example 17

For this example mixtures were cast using 50° F. water temperature to prevent the flash setting of the mixtures with the alkanolamine which tend to dry out too quickly at relatively higher temperatures particularly in the absence of fly ash. All mixtures were allowed to harden at room temperature for only 5 hours. Mixture (Mix #16) from the current invention with the Lehigh cement with four parts gypsum with 0.15% STMP and 4.5% potassium citrate was compared to mixtures with the alkanolamine and STMP (Mix #13, #14 and #15) from previous invention as well as with mixtures with class C fly ash also from previous invention (Mix #17 and #18).

From the cube compressive strength included in Table 37 the mixture of the current invention have superior compressive strength at the early age i.e. 5 hr compared to mixtures with the triethanolamine (TEA) containing relatively low level of potassium citrate (0.20%) and compared to mixtures with STMP, potassium citrate, and class C fly ash.

TABLE 37

Mixtures for Example 17

| | Composition (grams) | | | | | |
|---|---|---|---|---|---|---|
| | Mix #13 | Mix #14 | Mix #15 | Mix #16 | Mix #17 | Mix #18 |
| Lehigh cement | 973.7 | 973.7 | 973.7 | 973.7 | | |
| Gypsum | 38.9 | 38.9 | 38.9 | 38.9 | 38.9 | 0 |
| Class C fly ash | 0 | 0 | 0 | 0 | 973.7 | 1012.7 |

TABLE 37-continued

Mixtures for Example 17

| | Composition (grams) | | | | | |
|---|---|---|---|---|---|---|
| | Mix #13 | Mix #14 | Mix #15 | Mix #16 | Mix #17 | Mix #18 |
| Water | 401.3 | 401.3 | 401.3 | 401.3 | 401.3 | 376.7 |
| Expanded clay aggregate | 608 | 608 | 608 | 608 | 608 | 608 |
| Potassium citrate | 2.03 | 2.03 | 2.03 | 45.6 | 45.6 | 45.6 |
| STMP | 1.52 | 1.52 | 1.52 | 1.52 | 1.52 | 1.52 |
| Triethanolamine (85% solids) | 2.98 | 5.96 | 2.98 | 0 | 0 | 0 |
| Superplasticizer (40% solids) | 5.06 | 5.06 | 5.06 | 5.06 | 5.06 | 5.06 |
| Water/Cement | 0.40 | 0.40 | 0.40 | 0.40 | 0.40 | 0.375 |
| Aggregate/Cement | 0.60 | 0.60 | 0.60 | 0.60 | 0.60 | 0.60 |
| 5 hr CCS (psi) | 599 | 681 | 901 | 1765 | 385 | 1009 |

Example 18

For this example mixtures were cast also using 50° F. water temperature to prevent the flash setting of the mixtures with the alkanolamine but in this case all mixtures were allowed to harden at 65° F. for 5 hours after which the cube compressive strength was obtained. Mixtures from the current invention with the Lehigh cement with four parts gypsum and 0.15% STMP with 3.0 and 4.0% potassium citrate (Mix #21, #22 and #23) were compared to mixtures with the alkanolamine and STMP (Mix #19 and #20) from prior processes as well as with mixtures with class C fly ash also from previous invention (Mix #24 and #25) containing 4% potassium citrate with 4 parts gypsum. All mixtures contained 0.20% (% solids by wt. of cement powders) naphthalene based dispersant and the TEA used was the low freeze grade (LFG) which contains 85% solids and 15% water.

From the cube compressive strength included in Table 38 we notice that mixtures with the current invention have superior compressive strength at the early age of 5 hr compared to mixtures with the triethanolamine (TEA) containing relatively low level of potassium citrate (0.20%) and compared to mixtures with the fly ash compositions with water to cement ratio of 0.35. Mixtures with the class C fly ash with gypsum had improved compressive strength as the water to cement ratio was reduced to 0.25 (as described in previous compositions) but the strength for the fly ash mixture is drastically reduced as the water to cement ratio is increased to 0.35 in the presence of 4 parts gypsum.

Example 19 (Chemical Shrinkage)

Figure 18:
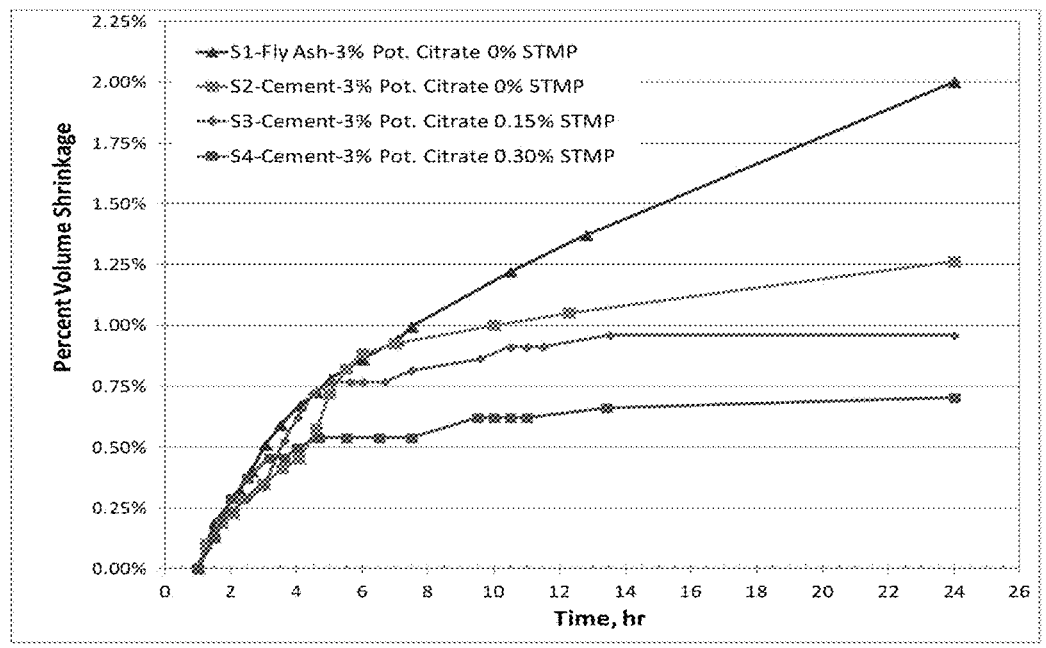
FIG. 18 is a graph of chemical shrinkage of Class C fly ash paste compared to shrinkage of cement pastes with various amounts of STMP additions.

Mixtures from the current invention with the Lehigh cement with four parts (2 wt %) gypsum and 3 wt % potassium citrate at various STMP dosages with water to cement ratio of 0.35 were compared to mixtures with class C fly ash with 3% potassium citrate with w/c of 0.25. Table 39 contains the cement paste compositions and chemical shrinkage for pastes used in this example and FIG. 18 shows the chemical shrinkage behavior of different pastes during the first 24 hrs of hydration.

Portland Cement Paste Vs. Fly Ash Paste.

In general we notice that the chemical shrinkage for the pastes with the class C fly ash is about 40% higher compared to the cement paste with 0% STMP. This is significant because the class C fly ash pastes have a lower water to cement ratio of 0.25 compared to 0.35 for the cement paste. In general it would be expected that pastes with higher water content would have higher chemical shrinkage.

Paste with Various Phosphates.

Addition of STMP to the cement pastes further reduced shrinkage by about 20 to 40%. Cement pastes with 0.15% and 0.30% STMP (by wt. of cement and gypsum) had 24-hr shrinkage of 0.96% and 0.70% compared to 1.26% for pastes with zero STMP.

This data shows the benefit of using portland cement (with relatively high ferrite content of 5 to 15 wt %) activated with combinations of alkali citrate/STMP resulting in reduced shrinkage during the early age hydration of hydraulic cement pastes compared to the fly ash and citrate mixtures.

TABLE 38

Mixtures for Example 18

| | Composition (grams) | | | | | | |
|---|---|---|---|---|---|---|---|
| | Mix #19 | Mix #20 | Mix #21 | Mix #22 | Mix #23 | Mix #24 | Mix #25 |
| Cement | 961.5 | 961.5 | 961.5 | 961.5 | 986.2 | 0 | 0 |
| Gypsum | 38.5 | 38.5 | 38.5 | 38.5 | 39.5 | 39.5 | 41.6 |
| Class C fly ash | 0 | 0 | 0 | 0 | 0 | 986.2 | 1039.5 |
| Water | 397.0 | 397.0 | 397.0 | 397.0 | 381.0 | 355.9 | 267.0 |
| Aggregate | 608 | 608 | 608 | 608 | 615 | 615 | 608 |
| Pot. Citrate | 2.0 | 2.0 | 30.0 | 40.0 | 41.0 | 41.0 | 43.2 |
| STMP | 0.0 | 1.5 | 1.5 | 1.5 | 1.5 | 1.5 | 0 |
| TEA | 2.94 | 2.94 | 0 | 0 | 0 | 0 | 0 |
| W/C ratio | 0.40 | 0.40 | 0.40 | 0.40 | 0.371 | 0.35 | 0.25 |
| A/C ratio | 0.60 | 0.60 | 0.60 | 0.60 | 0.60 | 0.60 | 0.60 |
| 5-hour CCS, psi | 483 | 711 | 1037 | 1242 | 1682 | 464 | 2076 |

Figure 19:
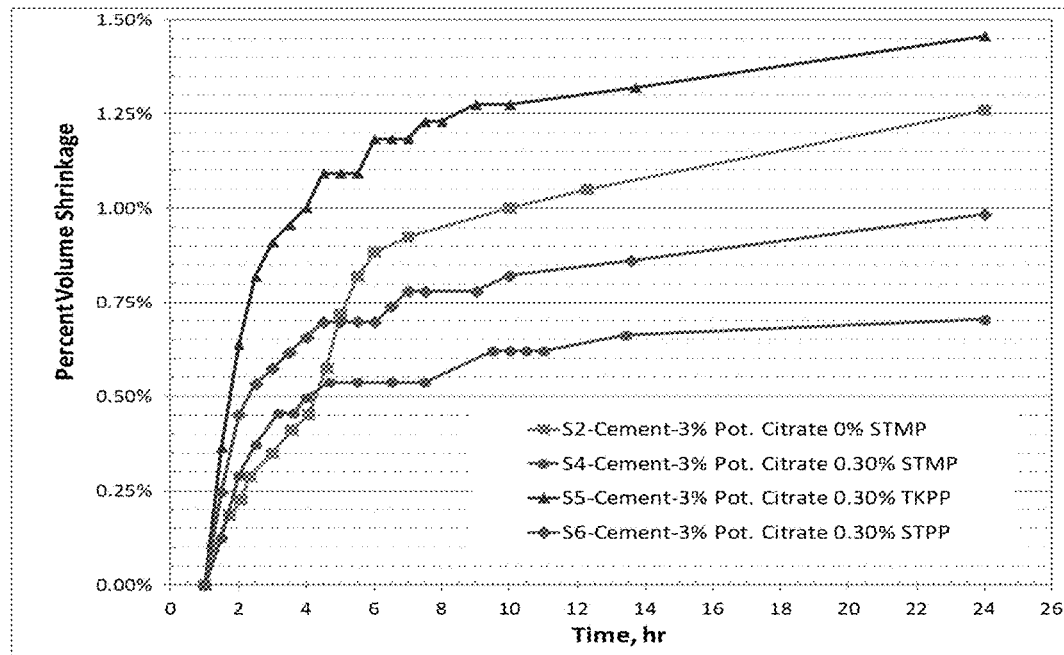
FIG. 19 is a graph of chemical shrinkage cement pastes with addition of various phosphates in Example 19.

Cement pastes containing other phosphates were evaluated. For this example tetra-potassium pyrophosphate (TKPP) and sodium tri-polyphosphate (STPP) were compared to pastes containing STMP. FIG. 18 shows The chemical shrinkage for cement pastes with 3.0% potassium citrate and 0.30% each of STMP, TKPP, and STPP. From FIG. 19 and Table 39, the pastes containing STMP and STPP had a measured chemical shrinkage of 0.70% and 0.98% relative to pastes without phosphate for which the measured shrinkage was 1.26%. By contrast pastes with TKPP measured an increased the chemical shrinkage of 1.46%. The cement pastes with and without the various phosphates had relatively lower shrinkage compared to the fly ash pastes which measured 2.0% shrinkage.

TABLE 39

Mixtures for Example 19

| | Composition (grams) | | | | | |
|---|---|---|---|---|---|---|
| | Mix S1 | Mix S2 | Mix S3 | Mix S4 | Mix S5 | Mix S6 |
| Lehigh Cement type III | | 192.0 | 192.0 | 192.0 | 192.0 | 192.0 |
| Gypsum | | 8.0 | 8.0 | 8.0 | 8.0 | 8.0 |
| Class C fly ash | 200 | 0 | 0 | 0 | 0 | 0 |
| Water | 50 | 70 | 70 | 70 | 70 | 70 |
| Aggregate | 0 | 0 | 0 | 0 | 0 | 0 |
| Potassium citrate | 6.0 | 6.0 | 6.0 | 6.0 | 6.0 | 6.0 |
| STMP | 0 | 0 | 0.30 | 0.60 | | |
| TKPP | | | | | 0.60 | |
| STPP | | | | | | 0.60 |
| Superplasticizer (40% | 0 | 2.5 | 2.5 | 2.5 | 2.5 | 2.5 |
| W/C ratio | 0.25 | 0.35 | 0.35 | 0.35 | 0.35 | 0.35 |
| 24-hour Shrinkage, % | 2.0 | 1.26 | 0.96 | 0.70 | 1.46 | 0.98 |

Figure 20:
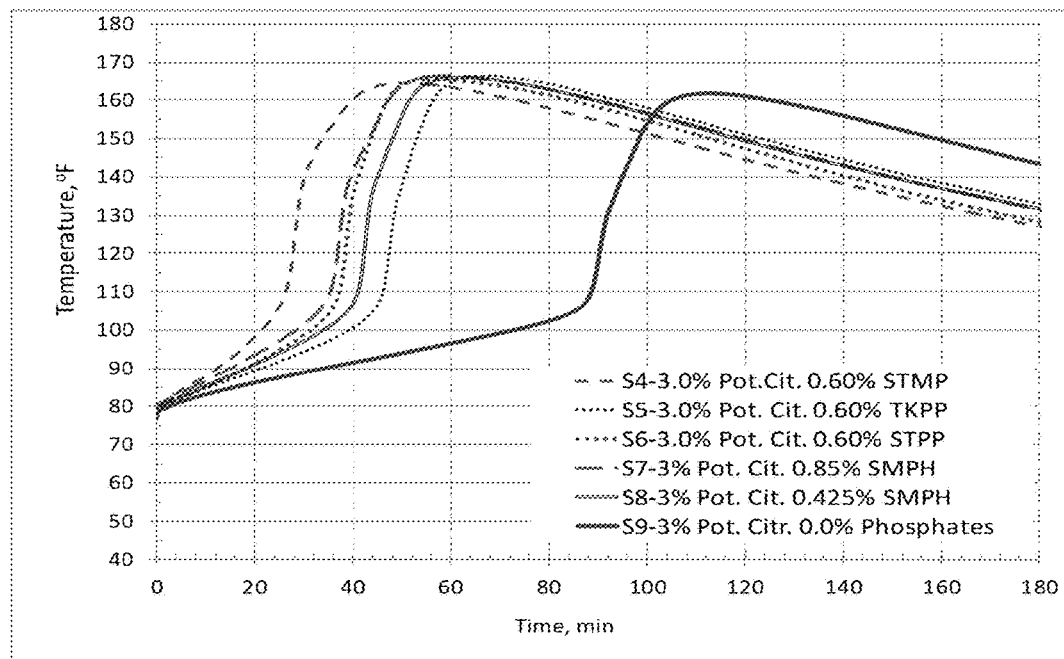
FIG. 20 is a graph of temperature rise data for cement pastes with 3% potassium citrate and various phosphates in Example 19.

Table 40 and FIG. 20 contains the temperature rise data for cement pastes with 3% potassium citrate and various sodium phosphates added. Some of the mixtures were described in Table 39 with the proportions for pastes labeled as S4, S5, and S6. In addition pastes containing sodium monophosphate hydrate with chemical formula $NaH_2PO_4.2H_2O$ (abbreviated here as SMPH). Paste mixtures labeled S7 and S8 contained SMPH at 0.85% and 0.425%, respectively. From this data we notice that paste mixtures with the various phosphates reach the maximum temperature within 28 to 47 minutes. By contrast it takes about 90 minutes for paste mixture (S9) without any phosphate to reach maximum temperature. Similarly, the time for final setting for pastes with the various phosphates ranges from 53 to 76 minutes compared almost two hours for pastes without the phosphates.

TABLE 40

Temperature Rise for Paste Mixtures in Example 19

| | Composition (grams) | | | | | |
|---|---|---|---|---|---|---|
| | Mix S4 | Mix S5 | Mix S6 | Mix S7 | Mix S8 | Mix S9 |
| Lehigh Cement type III | 384 | 384 | 384 | 384 | 384 | 384 |
| Gypsum | 16.0 | 16.0 | 16.0 | 16.0 | 16.0 | 16.0 |
| Class C fly ash | 0 | 0 | 0 | 0 | 0 | 0 |
| Water | 140 | 140 | 140 | 140 | 140 | 140 |
| Aggregate | 0 | 0 | 0 | 0 | 0 | 0 |
| Potassium citrate | 12.0 | 12.0 | 12.0 | 12.0 | 12.0 | 12.0 |
| STMP | 1.2 | | | | | — |
| TKPP | | 1.2 | | | | — |
| STPP | | | 1.2 | | | — |
| SMPH | | | | 1.7 | 0.85 | — |
| Superplasticizer (40% | 5.0 | 5.0 | 5.0 | 5.0 | 5.0 | 5.0 |
| W/C ratio | 0.35 | 0.35 | 0.35 | 0.35 | 0.35 | 0.35 |
| Initial Temperature, ° F. | 79.9 | 79.5 | 79.3 | 79.1 | 76.4 | 77.3 |
| Max Temperature, ° F. | 164.5 | 166.4 | 165.7 | 166.5 | 165.9 | 161.8 |
| Time to Max Temperature, min | 48.9 | 65.9 | 56.4 | 57.4 | 60.6 | 110.8 |
| Max Rise, ° F. | 84.6 | 86.9 | 86.4 | 87.4 | 89.5 | 84.5 |
| Final setting time, min | 53 | 72 | 60 | 73 | 76 | 118 |

Figure 21:
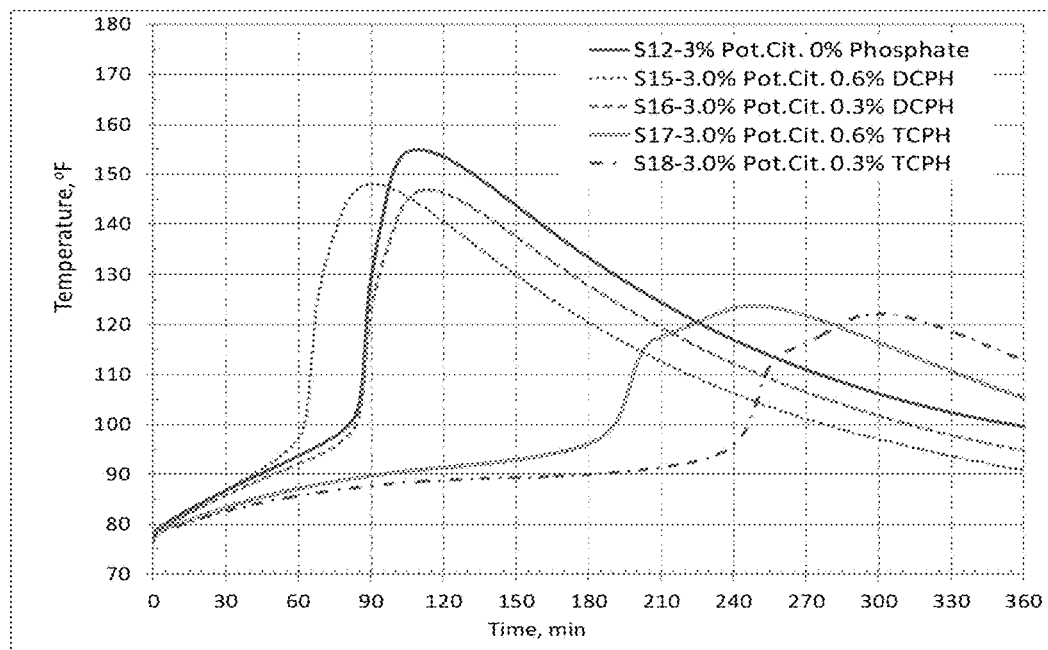
FIG. 21 is a graph of temperature rise data for cement pastes with 3% potassium citrate and various calcium phosphates and amounts.

Table 41 and the graph in FIG. 21 contain the temperature rise data for cement pastes with 3% potassium citrate and various calcium phosphates added. The mixtures with the di-calcium phosphates are relatively less effective in reducing final setting times. In the case of mixtures containing tricalcium phosphate, the setting time is actually increased to more than 3 hours.

Figure 22:
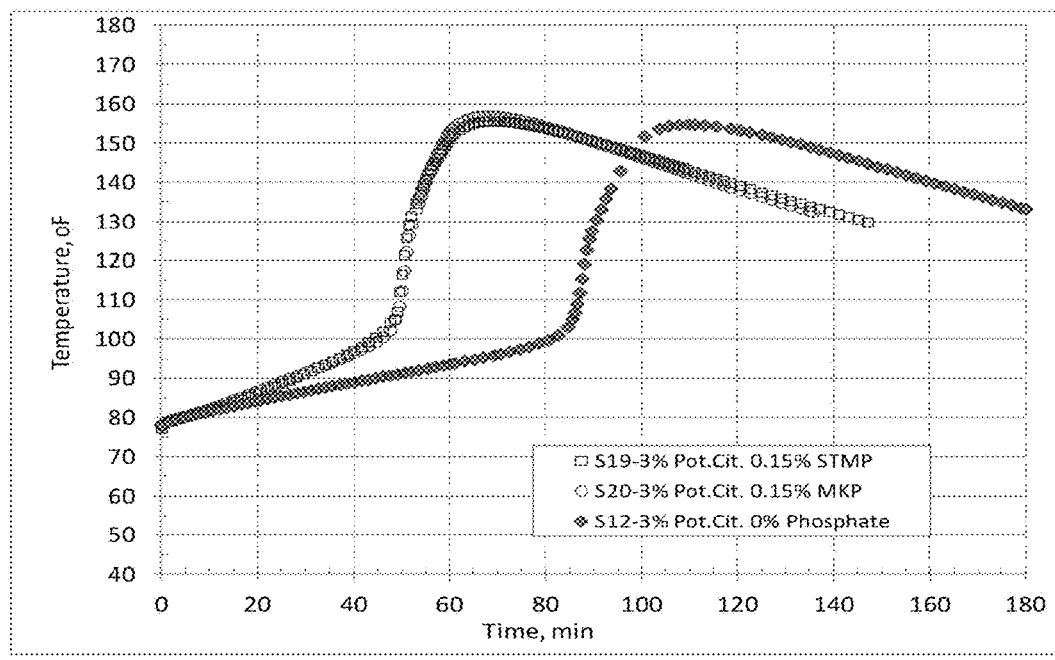
FIG. 22 is a graph of temperature rise versus time for cement pastes with 3% potassium citrate and 0% phosphate versus 0.15% mono-potassium phosphate and 0.15% STMP.

Table 41 and the graph in FIG. 22 contains the temperature rise data for cements with 0.15% monopotassium phosphate (MKP) compared to mixtures with 0.15% STMP and to mixtures with zero percent phosphates. We notice that surprisingly the MKP has similar efficiency as the STMP in accelerating the setting times of the Lehigh cement relative to mixtures without phosphate.

TABLE 41

Temperature Rise Paste Mixtures with Various Calcium Phosphates and Monopotassium Phosphate (MKP)

| | Composition (grams) | | | | | | |
|---|---|---|---|---|---|---|---|
| | Mix S12 | Mix S15 | Mix S16 | Mix S17 | Mix S18 | Mix S19 | Mix S20 |
| Lehigh Cement type III | 384 | 384 | 384 | 384 | 384 | 384 | 384 |
| Gypsum | 16.0 | 16.0 | 16.0 | 16.0 | 16.0 | 16.0 | 16.0 |
| Class C fly ash | 0 | 0 | 0 | 0 | 0 | 0 | 0 |
| Water | 140 | 140 | 140 | 140 | 140 | 140 | 140 |

TABLE 41-continued

Temperature Rise Paste Mixtures with Various Calcium Phosphates and Monopotassium Phosphate (MKP)

| | Composition (grams) | | | | | | |
|---|---|---|---|---|---|---|---|
| | Mix S12 | Mix S15 | Mix S16 | Mix S17 | Mix S18 | Mix S19 | Mix S20 |
| Aggregate | 0 | 0 | 0 | 0 | 0 | 0 | 0 |
| Potassium citrate | 12.0 | 12.0 | 12.0 | 12.0 | 12.0 | 12.0 | 12.0 |
| Dicalcium Phosphate | | 2.4 | 1.2 | | | | |
| Tricalcium Phosphate | | | | 2.4 | 1.2 | | |
| Monopotassium Phosphate | | | | | | 0.60 | |
| Sodium Trimetaphosphate | | | | | | | 0.60 |
| Superplasticizer (40% | 5.0 | 5.0 | 5.0 | 5.0 | 5.0 | 5.0 | 5.0 |
| W/C ratio | 0.35 | 0.35 | 0.35 | 0.35 | 0.35 | 0.35 | 0.35 |
| Initial Temperature, ° F. | 78.1 | 77.3 | 77.7 | 77.4 | 76.5 | 77.3 | 76.5 |
| Max Temperature, ° F. | 154.8 | 148.1 | 146.9 | 123.7 | 122.2 | 155.7 | 122.2 |
| Time to Max Temperature, min | 107.8 | 89.9 | 112.1 | 247.8 | 298.5 | 68.9 | 78.9 |
| Max Rise, ° F. | 84.6 | 86.9 | 86.4 | 87.4 | 89.5 | 67.0 | 78.9 |
| Final setting time, min | 120 | 95 | 125 | >4 hr | >>4 hr | 79 | 79 |

Although we have described the embodiments for implementing our invention, it will be understood by those skilled in the art to whom this disclosure is directed that modifications and additions may be made to our invention without departing from its spirit and scope.

What is claimed:

1. A composition for cement board comprising a water settable mixture of:
    a cementitious reactive powder comprising 80 to 100 wt. % hydraulic cement and no more than 10 wt % fly ash, wherein the hydraulic cement comprises:
        about 80 to 100 wt % said portland cement,
        0 to 20 wt % calcium aluminate cement,
        0 to 7 wt % calcium sulfate, and
        0 to 5 wt. % other hydraulic cements;
    an alkali metal citrate selected from the group consisting of sodium citrate, a potassium citrate, and mixtures thereof, wherein the mixture comprises the alkali metal citrate in an amount of about 1.0 to 4.5 wt. % based on the weight of the cementitious reactive powder,
    sodium trimetaphosphate in an amount of about 0.05 to 1.5 wt % based upon the weight of the cementitious reactive powder, and
    water,
    wherein the mixture does not contain an alkanolamine,
    wherein there is an absence of sodium carbonate, potassium carbonate, and lithium carbonate;
    wherein other than the citrate and the phosphate there is an absence of inorganic set accelerator and an absence of set retarder.

2. The composition of claim 1, wherein the mixture contains no fly ash.

3. The composition of claim 1, wherein the cementitious reactive powder comprises 0.15 to 1.0 wt % sodium trimetaphosphate based upon the weight of the cementitious reactive powder.

4. The composition of claim 3, wherein the mixture comprises:
    about 2 to 4.5 wt. % tripotassium citrate based on the weight of the cementitious reactive powder, and
    sodium trimetaphosphate in an amount of 0.15 to 0.9 wt % based on the weight of the cementitious reactive powder;
    wherein the cementitious reactive powder comprises about 95 to 100 wt % portland cement,
    0 to 5 wt % calcium aluminate cement, and
    0 to 5 wt % calcium sulfate, based on the sum of the portland cement, calcium aluminate cement, and calcium sulfate.

5. The composition of claim 1, further comprising at least one member selected from the group consisting of expanded clay aggregate, foaming agent, air-entraining agent, superplasticizer and mixtures thereof.

6. The composition of claim 1, wherein the cementitious reactive powder comprises 0.15 to 0.3 wt % sodium trimetaphosphate based upon the weight of the cementitious reactive powder.

7. The composition of claim 1, wherein the cementitious reactive powder consists of:
    about 80 to 100 wt % portland cement,
    0 to 20 wt % calcium aluminate cement, and
    0 to 7 wt % calcium sulfate.

8. A method for preparing the composition comprising the water settable mixture of claim 1, comprising mixing:
    water,
    cementitious reactive powder comprising 80 to 100 wt. % hydraulic cement and no more than 10 wt. % fly ash, wherein the cementitious reactive powder comprises:
        about 80 to 100 wt % portland cement,
        0 to 20 wt % calcium aluminate cement, and
        0 to 7 wt % calcium sulfate;
    alkali metal citrate in a set accelerating amount of about 1.0 to 4.5 wt. % based on the weight of the cementitious reactive powder; and
    sodium trimetaphosphate in an amount of about 0.05 to 1.5 wt. % based on the weight of the cementitious reactive powder,
    to prepare the water settable mixture; and
    wherein the mixture does not contain an alkanolamine,
    wherein there is an absence of sodium carbonate, potassium carbonate, and lithium carbonate;
    wherein other than the citrate and the phosphate there is an absence of inorganic set accelerator and an absence of set retarder.

9. The method of claim 8, wherein the mixture is mixed at a temperature of about 90° F. to 135° F. (32.2° To 57.2° C.) and wherein the mixture temperature is achieved within about 3 to 5 minutes after mixing by heating one or more of the components of the mixture, wherein the cementitious reactive powder contains about 80 to 100 wt % portland cement, 0 to 20 wt % calcium aluminate cement, and 0 to 7 wt % calcium sulfate, based on the sum of the portland cement, calcium aluminate cement, and calcium sulfate, and the composition contains 1.0 to 4.5 wt. % alkali metal citrate based on the total weight of the reactive powder and 0.15 to 1.0 wt % sodium trimetaphosphate based upon the weight of the cementitious reactive powder.

10. The method of claim 8, wherein the cementitious reactive powder consists of:
about 80 to 100 wt % portland cement,
0 to 20 wt % calcium aluminate cement, and
0 to 7 wt % calcium sulfate.

11. A composition comprising the reaction product of a mixture of:
water;
a cementitious reactive powder comprising portland cement and no more than 10 wt % fly ash, wherein the cementitious reactive powder contains
about 80 to 100 wt % portland cement,
0 to 20 wt % calcium aluminate cement,
0 to 7 wt % calcium sulfate;
an alkali metal citrate selected from the group consisting of sodium citrate, a potassium citrate, and mixtures thereof, wherein the mixture comprises the alkali metal citrate in an amount equal to about 1.0 to 4.5 wt. % based on the weight of the cementitious reactive powder; and
sodium trimetaphosphate in an amount equal to 0.15 to 1.5 wt % based upon the weight of the cementitious reactive powder, and
wherein the composition does not contain an alkanolamine,
wherein there is an absence of sodium carbonate, potassium carbonate, and lithium carbonate;
wherein other than the citrate and the phosphate there is an absence of inorganic set accelerator and an absence of set retarder.

12. The composition of claim 11, wherein the product does not contain fly ash.

13. The composition of claim 11, wherein the composition contains the alkali metal citrate in an amount equal to 1.0 to 4.5 wt. % of the weight of the cementitious reactive powder and the sodium trimetaphosphate in an amount equal to 0.15 to 1.0 wt % based upon the weight of the cementitious reactive powder.

14. The composition of claim 13, wherein the mixture comprises tripotassium citrate in an amount equal to about 1.0 to 4.5 wt. % based on the weight of the cementitious reactive powder and sodium trimetaphosphate in an amount equal to 0.15 to 0.6 wt % based upon the weight of the cementitious reactive powder.

15. The composition of claim 11, consisting of the reaction product the mixture of:
the water; and
the cementitious reactive powder consisting of
60-100 wt % portland cement,
0-20 wt. % calcium aluminate cement,
0-5 wt % other hydraulic cement,
0-7 wt % calcium sulfate,
0-40 wt % pozzolans, and
0-7 wt % added lime, and
no more than 10 wt % of the cementitious reactive powder is fly ash;
the alkali metal citrate in an amount equal to 1.0 to 4.5 wt % of the cementitious reactive powder, the alkali metal citrate selected from the group consisting of sodium citrate, potassium citrate, and mixtures thereof,
the sodium trimetaphosphate in an amount equal to 0.05 to 1.5 wt. % of the cementitious reactive powder and aggregates and fillers wherein the weight ratio of total aggregate and filler to cementitious reactive powder is 0.4-1.2:1;
superplasticizers in an amount equal to 0.1 to 0.5 wt. % of the cementitious reactive powder, wherein the superplasticizers are selected from the group consisting of polynapthalene sulfonates, polyacrylates, polycarboxylates, lignosulfonates, melamine sulfonates;
optionally at least one member selected from the group consisting of shrinkage control agents, coloring agents, thickeners;
optionally air entraining/foaming agent selected from at least one member of the group consisting of alkyl ether sulfate oligomers, vinsol wood resins, sulfonated hydrocarbons, fatty and resinous acids, aliphatic substituted aryl sulfonates, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, alkylbenzenesulfonates, linear alkylbenzenesulfonates, alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof;
wherein there is the absence of sodium carbonate, potassium carbonate, and lithium carbonate,
wherein there is an absence of secondary inorganic set accelerator, wherein there is an absence of set retarder.

16. The composition of claim 15, wherein
the sodium trimetaphosphate is in an amount equal to 0.15 to 1.0 wt % based upon the weight of the cementitious reactive powder.

17. The composition of claim 16, wherein the alkali metal citrate is tripotassium citrate.

18. The composition of claim 11, wherein the cementitious reactive powder consists of:
about 80 to 100 wt % portland cement,
0 to 20 wt % calcium aluminate cement, and
0 to 7 wt % calcium sulfate.

19. A composition consisting of a water settable mixture of:
cementitious reactive powder consisting of
60-100 wt % portland cement,
0-20 wt. % calcium aluminate cement,
0-5 wt % other hydraulic cement based on the sum of the portland cement, calcium aluminate cement, calcium sulfate, and other hydraulic cements,
0-7 wt % calcium sulfate,
0-40 wt % pozzolans, and
0-7 wt % added lime, and
no more than 10 wt % of the cementitious reactive powder is fly ash;
alkali metal citrate in an amount equal to 1.0 to 4.5 wt % of the composition, wherein the alkali metal citrate is selected from the group consisting of sodium citrate, potassium citrate, and mixtures thereof,
sodium trimetaphosphate in an amount equal to 0.05 to 1.5 wt. % of the cementitious reactive powder and water,
aggregates and fillers wherein the weight ratio of total aggregate and filler to cementitious reactive powder is 0.4-1.2:1;

superplasticizers in an amount equal to 0.1 to 0.5 wt. % of the cementitious reactive powder, wherein the superplasticizers are selected from the group consisting of polynapthalene sulfonates, polyacrylates, polycarboxylates, lignosulfonates, melamine sulfonates;

optionally at least one member selected from the group consisting of shrinkage control agents, coloring agents, thickeners;

optionally air entraining/foaming agent selected from at least one member of the group consisting of alkyl ether sulfate oligomers, vinsol wood resins, sulfonated hydrocarbons, fatty and resinous acids, aliphatic substituted aryl sulfonates, sodium abietate, saturated or unsaturated fatty acids and salts thereof, tensides, alkyl-aryl-sulfonates, phenol ethoxylates, lignosulfonates, resin soaps, sodium hydroxystearate, lauryl sulfate, alkylbenzenesulfonates, linear alkylbenzenesulfonates, alkanesulfonates, polyoxyethylene alkyl(phenyl)ethers, polyoxyethylene alkyl(phenyl)ether sulfate esters or salts thereof, polyoxyethylene alkyl(phenyl)ether phosphate esters or salts thereof, proteinic materials, alkenylsulfosuccinates, alpha-olefinsulfonates, a sodium salt of alpha olefin sulphonate, or sodium lauryl sulphate or sulphonate and mixtures thereof;

wherein there is an absence of sodium carbonate, potassium carbonate, and lithium carbonate, wherein there is an absence of secondary inorganic set accelerator, wherein there is an absence of set retarder.

20. The composition of claim 19, wherein the amount of alkali metal citrate present is 2 to 4.5 wt. % based on the total weight of the reactive powder, and wherein the amount of sodium trimetaphosphate present is 0.15 to 0.9 wt % based upon the weight of the cementitious reactive powder.

* * * * *